US009414394B2

(12) United States Patent
Chakraborty et al.

(10) Patent No.: US 9,414,394 B2
(45) Date of Patent: Aug. 9, 2016

(54) AVOIDING SUSPENDED TRANSMISSION DURING NETWORK LISTEN FOR SMALL CELL BASE STATIONS

(71) Applicant: QUALCOMM Incorporated, San Diego, CA (US)

(72) Inventors: Kaushik Chakraborty, San Diego, CA (US); Soumya Das, San Diego, CA (US); Insoo Hwang, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 13/964,900

(22) Filed: Aug. 12, 2013

(65) Prior Publication Data

US 2015/0043437 A1    Feb. 12, 2015

(51) Int. Cl.
*H04W 72/08* (2009.01)
*H04W 16/10* (2009.01)
*H04W 52/24* (2009.01)
*H04B 1/525* (2015.01)
*H04W 84/04* (2009.01)
*H04W 52/14* (2009.01)

(52) U.S. Cl.
CPC .......... *H04W 72/082* (2013.01); *H04W 16/10* (2013.01); *H04W 52/243* (2013.01); *H04B 1/525* (2013.01); *H04W 52/143* (2013.01); *H04W 52/245* (2013.01); *H04W 84/045* (2013.01)

(58) Field of Classification Search
CPC . H04W 72/082; H04W 16/10; H04W 52/243; H04W 52/143; H04W 52/245; H04W 84/045; H04B 1/525

USPC .............. 370/342, 252, 329; 455/561, 522
See application file for complete search history.

(56) References Cited

U.S. PATENT DOCUMENTS

| | | | |
|---|---|---|---|
| 8,031,686 B2 * | 10/2011 | Li et al. | 370/342 |
| 8,737,921 B2 * | 5/2014 | Hong et al. | 455/63.1 |
| 8,767,645 B2 * | 7/2014 | Kim et al. | 370/329 |
| 8,781,483 B2 * | 7/2014 | Ch'ng | 455/450 |
| 8,934,896 B2 * | 1/2015 | Zhu | 455/434 |
| 2009/0312028 A1 | 12/2009 | Burchfiel | |
| 2011/0019638 A1 | 1/2011 | Hamel et al. | |

(Continued)

FOREIGN PATENT DOCUMENTS

WO    WO-2012158578 A1    11/2012

OTHER PUBLICATIONS

International Search Report and Written Opinion—PCT/US2014/050502—ISA/EPO—Apr. 21, 2015.

(Continued)

*Primary Examiner* — Chandrahas Patel
(74) *Attorney, Agent, or Firm* — Foley & Lardner LLP

(57) ABSTRACT

Techniques for compensating for self-induced interference in a small cell base station are provided. The techniques include detecting control signals from a neighboring base station associated with a wireless communication network, the control signals being transmitted by the neighboring base station at predetermined intervals, and compensating for self-induced interference caused by a transmitter of the small cell base station transmitting during the predetermined intervals in which control signals are received from the neighboring base station and the transmitter of the small cell base station is transmitting data.

60 Claims, 9 Drawing Sheets

(56) References Cited

U.S. PATENT DOCUMENTS

| | | |
|---|---|---|
| 2011/0117967 A1 | 5/2011 | Vedantham et al. |
| 2011/0243202 A1 | 10/2011 | Lakkis |
| 2011/0306347 A1 | 12/2011 | Choi et al. |
| 2012/0224545 A1 | 9/2012 | Ohta et al. |
| 2012/0263078 A1 | 10/2012 | Tung |
| 2012/0275394 A1 | 11/2012 | Gunnarsson et al. |
| 2012/0309394 A1 | 12/2012 | Radulescu et al. |
| 2013/0090127 A1 | 4/2013 | Nishikawa et al. |
| 2013/0188624 A1 | 7/2013 | Lee |

OTHER PUBLICATIONS

Partial International Search Report—PCT/US2014/050502—ISA/EPO—Feb. 20, 2015.

* cited by examiner

Frequency Separation

Self-Induced Interference Cancellation

Compensating for Self-Induced Interference

Small Cell Base Station Transmitter Power Deboost

Select Operating Power for Deboost

Select Neighboring Base Station

Transmission Scheduling

AVOIDING SUSPENDED TRANSMISSION DURING NETWORK LISTEN FOR SMALL CELL BASE STATIONS

BACKGROUND

Femtocells and other types of small cell base stations can be used to extend the coverage of a network provider's network by providing small base stations that can be installed in a user's home or office. The femtocells can help to solve capacity problems of the macro network as demand for voice and data services increases.

Femtocells and other types of small cell base stations may include a Network Listen (NL) Module that includes some mobile-station-like capabilities that allow the NL module to detect downlink control signals from a neighboring base station having a coverage area in which the small cell base station is located. The NL module can be configured to receive Over-the-Air (OTA) signals from neighboring base stations. The NL module can be configured to listen for and decode the OTA signals transmitted by neighboring base stations to obtain relevant information from one or more networks proximate to the base station that includes the NL module. The NL module can be configured to enable the base station to execute applications, including, but not limited to: (a) self-organizing network (SON) related applications, such as building a neighbor list, physical cell identity (PCI) selection to avoid PCI collisions with neighboring cells; (b) approximate location determination using cell global identity (CGI) of neighboring base stations; (c) time and frequency synchronization; and (d) interference management. The NL module of a small cell base station can be configured to listen for OTA signals from a neighboring base station and can be configured to use these signals from neighboring base station, such as a macrocell base station or even another small cell base station.

With respect to time and frequency synchronization, the NL listen module can enable a small cell base station to correct for timing and/or frequency synchronizations at the small cell base station. Some conventional base stations are configured to advertise the synchronization capability of the base station in terms of a relative ranking, referred to as a synchronization stratum. A small cell base station that includes a NL module can determine whether a neighboring base station has a tighter synchronization capability than the small cell base station based on the synchronization capability information advertised by the neighboring base station. Base stations having a lower stratum level, which implies that the base station has looser synchronization accuracy, can be configured to listen to control signals from base stations advertising a higher stratum level, and thus, tighter synchronization accuracy. The NL module of a small cell base station can thus be configured to select a neighboring base station advertising a higher stratum level. For example, a small cell base station may have a neighboring picocell, a neighboring macrocell base station, and a neighboring femtocell from which the small cell base station from which the small cell base station could obtain synchronization information. Macrocell base stations and picocells typically have tighter synchronization requirements than a femtocell, and may advertise be associated with a higher synchronization stratum level than the femtocell. However, in some femtocell implementations may have a higher synchronization level. For example, some femtocells may be configured to derive synchronization from reliable external sources, such as a Global Navigation Satellite System (GNSS) including the Global Positioning System (GPS) or from a network server using Precision Timing Protocol (PTP). Accordingly, a femtocell (or other small cell base station) may be associated with a high stratum level.

SUMMARY

An example method for compensating for interference in a small cell base station according to the disclosure includes detecting control signals from a neighboring base station associated with a wireless communication network, the control signals being transmitted by the neighboring base station at predetermined intervals, and compensating for self-induced interference caused by a transmitter of the small cell base station transmitting during the predetermined intervals in which control signals are received from the neighboring base station and the transmitter of the small cell base station is transmitting data.

Implementations of such a method may include one or more of the following features. The neighboring base station comprises a macrocell base station, a picocell base station, a microcell base station, or a femtocell base station. The neighboring base station comprises a base station having a more accurate time and frequency reference than the small cell base station. The small cell base station may be configured to operate using a different downlink frequency than the neighboring base station. Receiving signals from a plurality of neighboring base stations, selecting the neighboring base station from the plurality of base stations based on the signals received from the plurality of neighboring base stations, and detecting the control signals from the selected neighboring base station. Selecting the neighboring base station from the plurality of base stations based on the signals received from the plurality of neighboring base stations further includes ranking the neighboring base stations based on one or more ranking criteria. The one or more ranking criteria include at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station. Compensating for the self-induced interference caused by the transmitter of the small cell base station further includes: monitoring signals associated with data to be transmitted by the transmitter of the small cell base station, determining self-induced interference estimate for the receiver based on the signals associated with the data to be transmitted, and compensating for the self-induced interference based on the self-induced interference estimate. Compensating for the self-induced interference based on the self-induced interference estimate further includes: generating a baseband signal based on the self-induced interference estimate to cancel out the self-induced interference at the receiver, and providing the baseband signal to a receiver of the small cell base station. Compensating for the self-induced interference based on the self-induced interference estimate includes: generating a radio frequency signal based on the self-induced interference estimate to cancel out the self-induced interference at the receiver, and providing the radio frequency signal to a receiver of the small cell base station. Compensating for the self-induced interference caused by the transmitter of the small cell base station further comprises: identifying at least one mobile device attached to the small cell base station, determining whether any of the at least one mobile device attached to the small cell base station is near the edge of a cell coverage area provided by the small cell base station, and determining a reduced transmit power level at which to operate the small cell base station during the period in which control signals are received from the macrocell if none of the at least one mobile device attached to the small cell base station is near the edge of the cell coverage area. Operating the small cell base station transmitter at the reduced power level during the period in which control signals are received from the macrocell. Determining the reduced transmit power level at which to operate the small cell base station during the period in which control signals are received from the macrocell further includes: determining a relative distance of the at least one mobile device from the small cell base station, determining signal quality of communication links between the at least one mobile device, accessing quality of service (QoS) information associated with the at least one mobile device, and determining the reduced transmit power level at which to operate the small cell base station based on at least one of the relative distance, the signal quality, and the QoS information. Compensating for the self-induced interference caused by the transmitter of the small cell base station further includes: determining whether a transmission by the small cell base station scheduled for the period in which the control signals are received from the macrocell can be rescheduled outside of the period in which the control signals are received from the macrocell; and rescheduling the transmission by the small cell base station to occur outside of the period in which the control signals are received from the macrocell if the transmission can be rescheduled. Deriving from the control signals time and frequency synchronization information; and synchronizing timing of the small cell base station and a frequency used by the small cell base station based on the time and frequency synchronization information based on the time and frequency synchronization information.

An example apparatus for compensating for interference in a small cell base station according to the disclosure includes means for detecting control signals from a neighboring base station associated with a wireless communication network, the control signals being transmitted by the neighboring base station at predetermined intervals, and means for compensating for self-induced interference caused by a transmitter of the small cell base station transmitting during the predetermined intervals in which control signals are received from the neighboring base station and the transmitter of the small cell base station is transmitting data.

Implementations of such an apparatus may include one or more of the following features. The neighboring base station comprises a macrocell base station, a picocell base station, a microcell base station, or a femtocell base station. The neighboring base station comprises a base station having a more accurate time and frequency reference than the small cell base station. The small cell base station may be configured to operate using a different downlink frequency than the neighboring base station. Means for receiving signals from a plurality of neighboring base stations, means for selecting the neighboring base station from the plurality of base stations based on the signals received from the plurality of neighboring base stations, and means for detecting the control signals from the selected neighboring base station. The means for selecting the neighboring base station from the plurality of base stations based on the signals received from the plurality of neighboring base stations further include means for ranking the neighboring base stations based on one or more ranking criteria. The one or more ranking criteria include at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station. The means for compensating for the self-induced interference caused by the transmitter of the small cell base station include: means for monitoring signals associated with data to be transmitted by the transmitter of the small cell base station, means for determining self-induced interference estimate for the receiver based on the signals associated with the data to be transmitted, and means for compensating for the self-induced interference based on the self-induced interference estimate. The means for compensating for the self-induced interference based on the self-induced interference estimate include: means for generating a baseband signal based on the self-induced interference estimate to cancel out the self-induced interference at the receiver, and means for providing the baseband signal to a receiver of the small cell base station. The means for compensating for the self-induced interference based on the self-induced interference estimate further include: means for generating a radio frequency signal based on the self-induced interference estimate to cancel out the self-induced interference at the receiver, and means for providing the radio frequency signal to a receiver of the small cell base station. The means for compensating include: means for identifying at least one mobile device attached to the small cell base station, means for determining whether any of the at least one mobile device attached to the small cell base station is near the edge of a cell coverage area provided by the small cell base station, and means for determining a reduced transmit power level at which to operate the small cell base station during the period in which control signals are received from the macrocell if none of the at least one mobile device attached to the small cell base station is near the edge of the cell coverage area. The means for compensating include means for operating the small cell base station transmitter at the reduced power level during the period in which control signals are received from the macrocell. The means for determining the reduced transmit power level include: means for determining a relative distance of the at least one mobile device from the small cell base station, means for determining signal quality of communication links between the at least one mobile device, means for accessing quality of service (QoS) information associated with the at least one mobile device, and means for determining the reduced transmit power level at which to operate the small cell base station based on at least one of the relative distance, the signal quality, and the QoS information. The means for compensating for the self-induced interference caused by the transmitter of the small cell base station include: means for determining whether a transmission by the small cell base station scheduled for the period in which the control signals are received from the macrocell can be rescheduled outside of the period in which the control signals are received from the macrocell; and means for rescheduling the transmission by the small cell base station to occur outside of the period in which the control signals are received from the macrocell if the transmission can be rescheduled. Means for deriving from the control signals time and frequency synchronization information, and means for synchronizing timing of the small cell base station and a frequency used by the small cell base station based on the time and frequency synchronization information based on the time and frequency synchronization information.

An example non-transitory computer-readable medium, having stored thereon computer-readable instructions for compensating for interference in a small cell base station, according to the disclosure include instructions configured to cause a computer to: detect control signals from a neighboring base station associated with a wireless communication network, the control signals being transmitted by the neighboring base station at predetermined intervals, and compensate for self-induced interference caused by a transmitter of the small cell base station transmitting during the predetermined intervals in which control signals are received from the neighboring base station and the transmitter of the small cell base station is transmitting data.

Implementations of such a non-transitory computer-readable medium may include one or more of the following features. The neighboring base station comprises a macrocell base station, a picocell base station, a microcell base station, or a femtocell base station. The neighboring base station comprises a base station having a more accurate time and frequency reference than the small cell base station. The small cell base station may be configured to operate using a different downlink frequency than the neighboring base station. Instructions configured to cause the computer to: receive signals from a plurality of neighboring base stations, select the neighboring base station from the plurality of base stations based on the signals received from the plurality of neighboring base stations, and detect the control signals from the selected neighboring base station. The instructions configured to cause the computer to select the neighboring base station from the plurality of base stations based on the signals received from the plurality of neighboring base stations further include instructions configured to cause the computer to rank the neighboring base stations based on one or more ranking criteria. The one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station. The instructions configured to cause the computer to compensate for the self-induced interference include instructions configured to cause the computer to: monitor signals associated with data to be transmitted by the transmitter of the small cell base station, determine self-induced interference estimate for the receiver based on the signals associated with the data to be transmitted, and compensate for the self-induced interference based on the self-induced interference estimate. The instructions configured to cause the computer to compensate for the self-induced interference based on the self-induced interference estimate include instructions configured to cause the computer to: generate a baseband signal based on the self-induced interference estimate to cancel out the self-induced interference at the receiver, and provide the baseband signal to a receiver of the small cell base station. The instructions configured to cause the computer to compensate for the self-induced interference based on the self-induced interference estimate further include instructions configured to cause the computer to: generate a radio frequency signal based on the self-induced interference estimate to cancel out the self-induced interference at the receiver, and provide the radio frequency signal to a receiver of the small cell base station. The instructions configured to cause the computer to compensate for the self-induced interference include instructions configured to cause the computer to: identify at least one mobile device attached to the small cell base station, determine whether any of the at least one mobile device attached to the small cell base station is near the edge of a cell coverage area provided by the small cell base station, and determine a reduced transmit power level at which to operate the small cell base station during the period in which control signals are received from the macrocell if none of the at least one mobile device attached to the small cell base station is near the edge of the cell coverage area. Instructions configured to cause the computer to operate the small cell base station transmitter at the reduced power level during the period in which control signals are received from the macrocell. The instructions configured to cause the computer to determine the reduced transmit power level include instructions configured to cause the computer to: determine a relative distance of the at least one mobile device from the small cell base station, determine signal quality of communication links between the at least one mobile device, access quality of service (QoS) information associated with the at least one mobile device, and determine the reduced transmit power level at which to operate the small cell base station based on at least one of the relative distance, the signal quality, and the QoS information. The instructions configured to cause the computer to compensate for the self-induced interference caused by the transmitter of the small cell base station include instructions configured to cause the computer to: determine whether a transmission by the small cell base station scheduled for the period in which the control signals are received from the macrocell can be rescheduled outside of the period in which the control signals are received from the macrocell; and reschedule the transmission by the small cell base station to occur outside of the period in which the control signals are received from the macrocell if the transmission can be rescheduled. Instructions configured to cause the computer to derive from the control signals time and frequency synchronization information, and synchronize timing of the small cell base station and a frequency used by the small cell base station based on the time and frequency synchronization information based on the time and frequency synchronization information.

An example apparatus for compensating for interference in a small cell base station according to the disclosure includes a tangible, non-transitory computer-readable memory, a plurality of modules comprising processor executable code stored in the memory, a processor connected to the memory and configured to access the plurality of modules stored in the memory. The apparatus includes a network listen module configured to detect control signals from a neighboring base station associated with a wireless communication network, the control signals being transmitted by the neighboring base station at predetermined intervals, and compensate for self-induced interference caused by a transmitter of the small cell base station transmitting during the predetermined intervals in which control signals are received from the neighboring base station and the transmitter of the small cell base station is transmitting data.

Implementations of such an apparatus may include one or more of the following features. The neighboring base station comprises a macrocell base station, a picocell base station, a microcell base station, or a femtocell base station. The neighboring base station comprises a base station having a more accurate time and frequency reference than the small cell base station. The small cell base station is configured to operate using a different downlink frequency than the neighboring base station. The network listen module is configured to receive signals from a plurality of neighboring base stations, select the neighboring base station from the plurality of base stations based on the signals received from the plurality of neighboring base stations, and detect the control signals from the selected neighboring base station. The processor being configured to select the neighboring base station from the plurality of base stations based on the signals received from the plurality of neighboring base stations is further configured to rank the neighboring base stations based on one or more ranking criteria. The one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station. An interference compensation module configured to monitor signals associated with data to be transmitted by the transmitter of the small cell base station, determine self-induced interference estimate for the receiver based on the signals associated with the data to be transmitted, and compensate for the self-induced interference based on the self-induced interference estimate. The interference compensation module being configured to compensate for the self-induced interference based on the self-induced interference estimate is configured to generate a baseband signal based on the self-induced interference estimate to cancel out the self-induced interference at the receiver, and provide the baseband signal to a receiver of the small cell base station. The interference compensation module being configured to compensate for the self-induced interference based on the self-induced interference estimate further comprise instructions configured to cause the computer to: generate a radio frequency signal based on the self-induced interference estimate to cancel out the self-induced interference at the receiver, and provide the radio frequency signal to a receiver of the small cell base station. A power control module configured to identify at least one mobile device attached to the small cell base station, determine whether any of the at least one mobile device attached to the small cell base station is near the edge of a cell coverage area provided by the small cell base station, and determine a reduced transmit power level at which to operate the small cell base station during the period in which control signals are received from the macrocell if none of the at least one mobile device attached to the small cell base station is near the edge of the cell coverage area. The power control module is further configured to operate the small cell base station transmitter at the reduced power level during the period in which control signals are received from the macrocell. The power control module being configured to determine the reduced transmit power level is further configured to determine a relative distance of the at least one mobile device from the small cell base station, determine signal quality of communication links between the at least one mobile device; access quality of service (QoS) information associated with the at least one mobile device, and determine the reduced transmit power level at which to operate the small cell base station based on at least one of the relative distance, the signal quality, and the QoS information. A scheduling module configured to determine whether a transmission by the small cell base station scheduled for the period in which the control signals are received from the macrocell can be rescheduled outside of the period in which the control signals are received from the macrocell, and reschedule the transmission by the small cell base station to occur outside of the period in which the control signals are received from the macrocell if the transmission can be rescheduled. The network listen module is configured to: derive from the control signals time and frequency synchronization information, and synchronize timing of the small cell base station and a frequency used by the small cell base station based on the time and frequency synchronization information based on the time and frequency synchronization information.

DETAILED DESCRIPTION

Techniques for compensating for self-induced interference caused by the transmitter of a small cell base station interfering with the receiver of the small cell base station are disclosed herein. These techniques can be used to compensate for self-induced interference, in particular, during periods where the receiver of the small cell base station is configured to listen for control signals or other data from a neighboring base station. For example, the techniques disclosed herein can be applied during network listen periods where a femtocell or other small cell base station is configured to listen for in-band control signals from a neighboring base station. As described above, these OTA signals can be used by the small cell base station to perform various applications, such as (a) self-organizing network (SON) related applications, such as building a neighbor list, physical cell identity (PCI) selection to avoid PCI collisions with neighboring cells; (b) approximate location determination using cell global identity (CGI) of neighboring base stations; (c) time and frequency synchronization; and (d) interference management. The techniques disclosed herein allow the femtocell or other small cell base station to continue with downlink transmissions to one or more mobile devices connected to the small cell base station during periods where the small cell base station is configured to listen for such control signals. In conventional femtocells and small cell base stations, the transmissions by the transmitter of the femtocell or other small cell base station would typically be disabled during network listen periods or other periods where the small cell is expecting to receive control signals or other data from the neighboring base station. However, disabling downlink transmission during the network listen periods or other similar periods where the small cell base station is expecting to receive control signals or other data from the macrocell base station can disrupt service to mobile devices connected to the small cell base station. The techniques disclosed herein can be used to reduce and/or substantially eliminate self-induced interference caused by the transmitter of the small cell base station, thereby allowing the transmitter and the receiver of the small cell base station to operate concurrently and avoid causing disruptions to the service provided to the mobile devices connected to the small cell base station.

Example Network Environment

Figure 1:
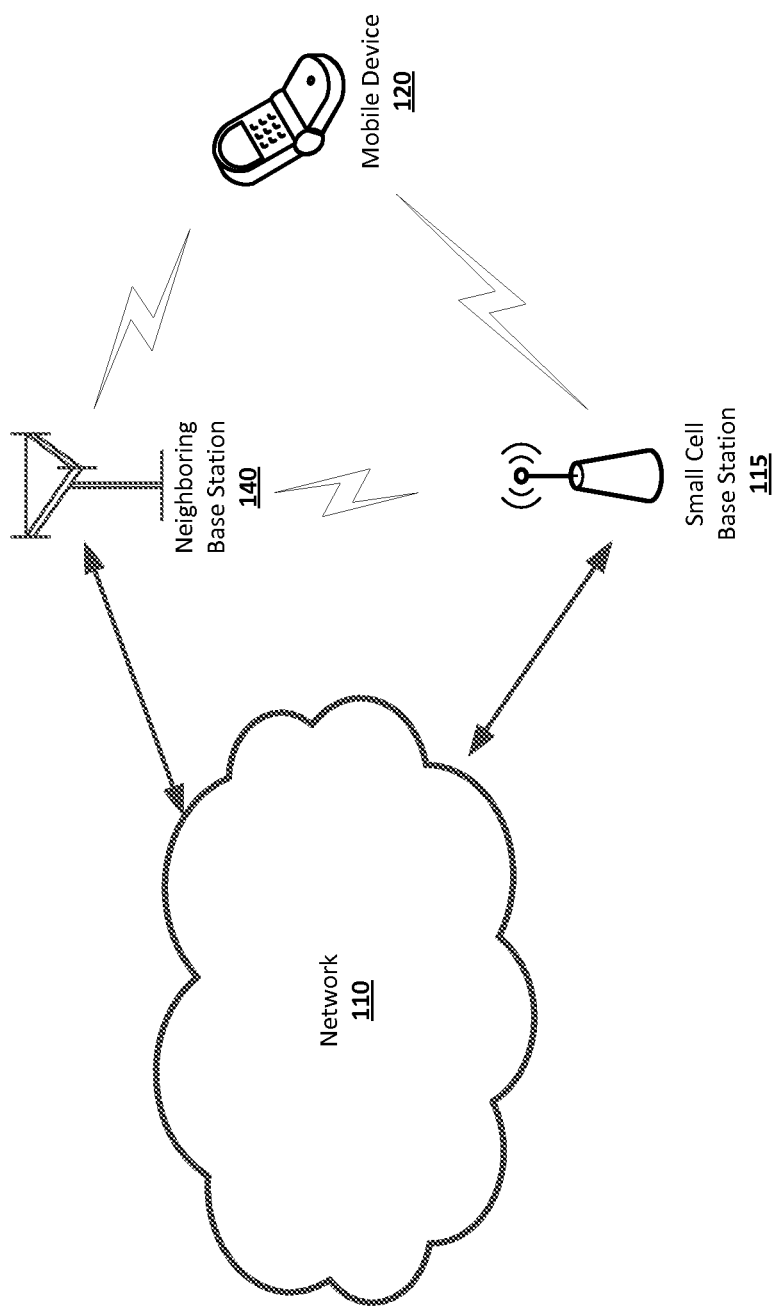
FIG. 1 is a block diagram of an example network architecture in which techniques disclosed herein can be implemented.

FIG. 1 is a block diagram of an example network architecture, which may be suitable for implementing the techniques discussed herein. The network architecture includes a mobile device 120, a small cell base station 115, a neighboring base station 140, and a network 110.

The mobile device 120 may also be referred to as a User Equipment (UE), a mobile station, a terminal, an access terminal, a subscriber unit, a station, etc. The mobile device 120 may be a smartphone, a tablet computer, a laptop computer, or other device that is configured to communicate using one or more wireless communications protocols, such as the Long Term Evolution (LTE) wireless communications protocols, WiFi, and WiMAX. The mobile device 120 may also be configured to support other types of wireless communications protocols and may be configured to support multiple different wireless communications protocols, allowing the mobile device 120 to connect to neighboring base stations, such as neighboring base station 140 operating using different frequency ranges and/or wireless communication protocols.

The mobile device 120 may also include one or more receivers configured to receive signals from transmitters of one or more Global Navigation Satellite Systems (GNSSs), which may be the United States Global Positioning System (GPS), the European Galileo system, the Russian GLONASS system, and/or some other GNSS. The mobile device 120 can be configured to determine a position of the mobile device 120 using the signals from the GNSSs transmitters and/or may be configured to send signal information to a location server (not shown) that is configured to determine the location of the mobile device 120 or to provide assistance data that the mobile device 120 can use to determine the position of the mobile device 120. The GNSS transmitters can comprise satellites, terrestrial broadcast stations, pseudolites, and other types of transmitters that provide signals that can be used to determine a position of the mobile device 120.

The small cell base station 115 may comprise a femtocell, a picocell, a microcell, or other type of small cell base station 115. The small cell base station 115 can be configured to provide wireless network connectivity to one or more mobile devices, such as the mobile device 120. The small cell base station 115 can be associated with a mobile communication network provider and can be configured to communicate with the mobile communication network provider's network (not shown) via the network 110. The coverage area of the small cell base station 115 may overlap with that of one or more base stations, such as neighboring base station 140. The small cell base station 115 can be connected to network 110 via a backhaul connection that provides a broadband connection to the network 110. The network 110 may be the Internet and/or a combination of one or more networks. For example, the small cell base station 115 may be connected to a DSL modem or a cable modem, depending upon the type of broadband service being used in that particular implementation.

The term "small cell base station" as used herein describes a radio access node that has a smaller footprint than a traditional macrocell base station. Some examples of small cell base stations that may be used to implement the techniques discussed herein include femtocells, picocells, and microcells. The various types of small cells are often classified by the size of the coverage area that the small cells provide. For example, a microcell may provide a coverage area of up to several kilometers from the microcell, a picocell may provide a coverage area having a range of up to several hundred meters from the picocell, and a femtocell may provide a coverage area having a range up to tens of meters from the femtocell. However, the distinction is not always clear as the size of the coverage areas provided by the small cells may overlap somewhat and may vary in different implementations. Furthermore, environmental factors, such as topography and man-made structures, can also impact the size of the coverage area provided by a particular small cell base station.

Neighboring base station 140 can be configured to provide wireless network connectivity to a plurality of mobile devices 120. The neighboring base station 140 may comprise a macrocell base station or may comprise a small cell base station similar, such as a microcell, picocell, or a femtocell. The neighboring base station 140 may have a much larger coverage area than the small cell base station 115 or may be a small cell base station that provides a coverage area that is of a similar size or of a smaller size than the coverage are provided by the small cell base station 115. Neighboring base station 140 can be configured to communicate using one or more wireless communications protocols. While the example illustrated in FIG. 1 includes on a single neighboring base station 140, in other implementations, the small cell base station 115 may fall within the coverage area of multiple neighboring base stations 140.

The small cell base station 115 or other small cell base station associated with the same network service provider as the neighboring base station 140 may be configured to support the same set of wireless communications protocols as the neighboring base station 140. For example, if the neighboring base station 140 is configured to support the Long Term Evolution (LTE) wireless communication protocols, the femtocells 115 and other small cells associated with the same network provider will typically also support the LTE wireless protocols. The small cell base station 115 may also be configured to support other wireless communication protocols.

The small cell base station 115 can be configured to include a Network Listen (NL) module that is configured to listen for control signals transmitted by the neighboring base station 140. In some implementations, the NL module can be configured to detect in-band, downlink control signals from a neighboring base station 115 having a coverage area in which the small cell base station 115 is located, such as the neighboring base station 140. In such an implementation, the small cell base station 115 is configured to transmit data to and receive data from the mobile devices 120 supported by the small cell base station 115 using the same frequency or set of frequencies used by the neighboring base station 140 for downlink transmissions. The control signals from the neighboring base station 140 may include timing and/or frequency synchronization information that the small cell base station 115 can use to correct timing and/or frequency synchronization errors at the small cell base station 115. The control signals may also include other information that the small cell base station 115 can use to support applications, such as (a) self-organizing network (SON) related applications, such as building a neighbor list, physical cell identity (PCI) selection to avoid PCI collisions with neighboring cells; (b) approximate location determination using cell global identity (CGI) of neighboring base stations; and (c) interference management.

If the transmitter of the small cell base station 115 were to transmit during the network listen period or other periods where the receiver of the small cell base station 115 is configured to listen for control signals or other information, the transmissions by the transmitter can cause self-induced interference in the receiver, because the transmitter and the receiver are operating within the same frequency channel or channels. In other implementations, the small cell base station 115 can be configured to operate in a different frequency band as the neighboring base station 140. In such an implementation, the NL module of the small cell base station 115 can be configured to tune to the neighboring base station's frequency band to detect the control signals broadcast by the neighboring base station 140.

The operation of the NL module can have an impact on the services provided to the mobile devices 120 connected to the small cell base station 115. In a conventional small cell base station 115, the NL module is typically configured to suspend downlink transmission between the small cell base station 115 and the mobile devices 120 connected to the small cell base station 115 during the period in which the NL module listens for the control signals from the neighboring base station 140 to avoid self-induced interference caused by the transmitter of the small cell base station 115. As a result, the mobile stations 120 connected to the small cell base station 115 may experience service disruptions or degradation during the network listen periods. Two types of suspended transmission (STX) service disruptions or degradations that may occur due to suspensions for network listen: (1) scheduled STX and (2) unscheduled STX. Scheduled STX occurs where the mobile devices 120 connected to the serving small cell base station 115 are informed about the suspension during the network listen period, and the mobile devices 120 are not expecting any transmission on the small cell base station 115 downlink. Unscheduled STX occurs where the mobile devices 120 are expecting downlink transmissions but the small cell base station 115 suspends transmission for the network listen period. In unscheduled STX, a mobile device 120 may experience different levels of disruption and/or service degradation based on the timing and/or duration of the suspension. For example, parameter estimation algorithms used by a mobile device 120, such as tracking loops and channel estimation, which filter instantaneous estimates every few milliseconds are likely to be disrupted where the STX duration exceeds 10-20 ms. Where the STX duration exceeds 50 ms, power control loops used by the mobile devices 120 may trigger higher uplink power, and the quality of voice over circuit switched channels of the Universal Mobile Telecommunications System (UMTS) may begin to degrade. STX durations exceeding 80 ms can impact delay sensitive traffic, such as Voice over IP (VoIP) traffic over Long Term Evolution (LTE) systems. Radio link failure (RLF) rate can also increase with increasing STX duration.

Figure 2:
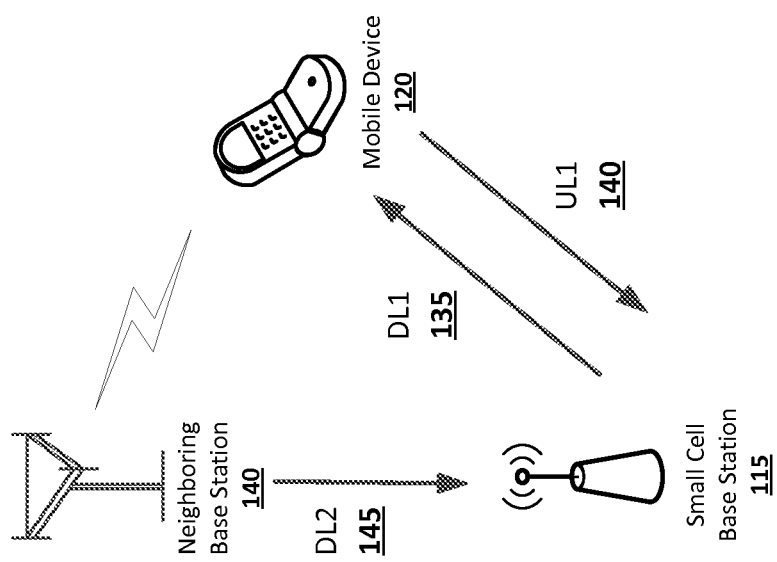
FIG. 2 is a block diagram of a portion of the example network illustrated in FIG. 1 illustrating uplink and downlink data connections.

FIG. 2 is a block diagram of a portion of the example network illustrated in FIG. 1 illustrating uplink and downlink data connections between various elements of the network environment. The downlink channel 135 from the small cell base station 115 to the mobile device 120 connected to the small cell base station 115 (referred to here as DL1) and the downlink channel 145 from the neighboring base station 140 to the small cell base station 115 (referred to here as DL2) may share the same frequency or frequencies. Accordingly, the small cell base station 115 may stop transmitting during periods in which the neighboring base station 140 is transmitting control signals on DL2 145 to avoid interference caused by the transmitter of the small cell base station 115 if the small cell base station 115 were to transmit on DL1 135 at the same time as the control signals were being transmitted on DL2 145. In other implementations, the DL1 and the DL2 may not share the same frequencies, and the NL listen module of the small cell base station 115 can be configured to tune the receiver of the small cell base station 115 to the frequency of the neighboring base station 140 during the network listen periods.

Figures 6, 7, 8:
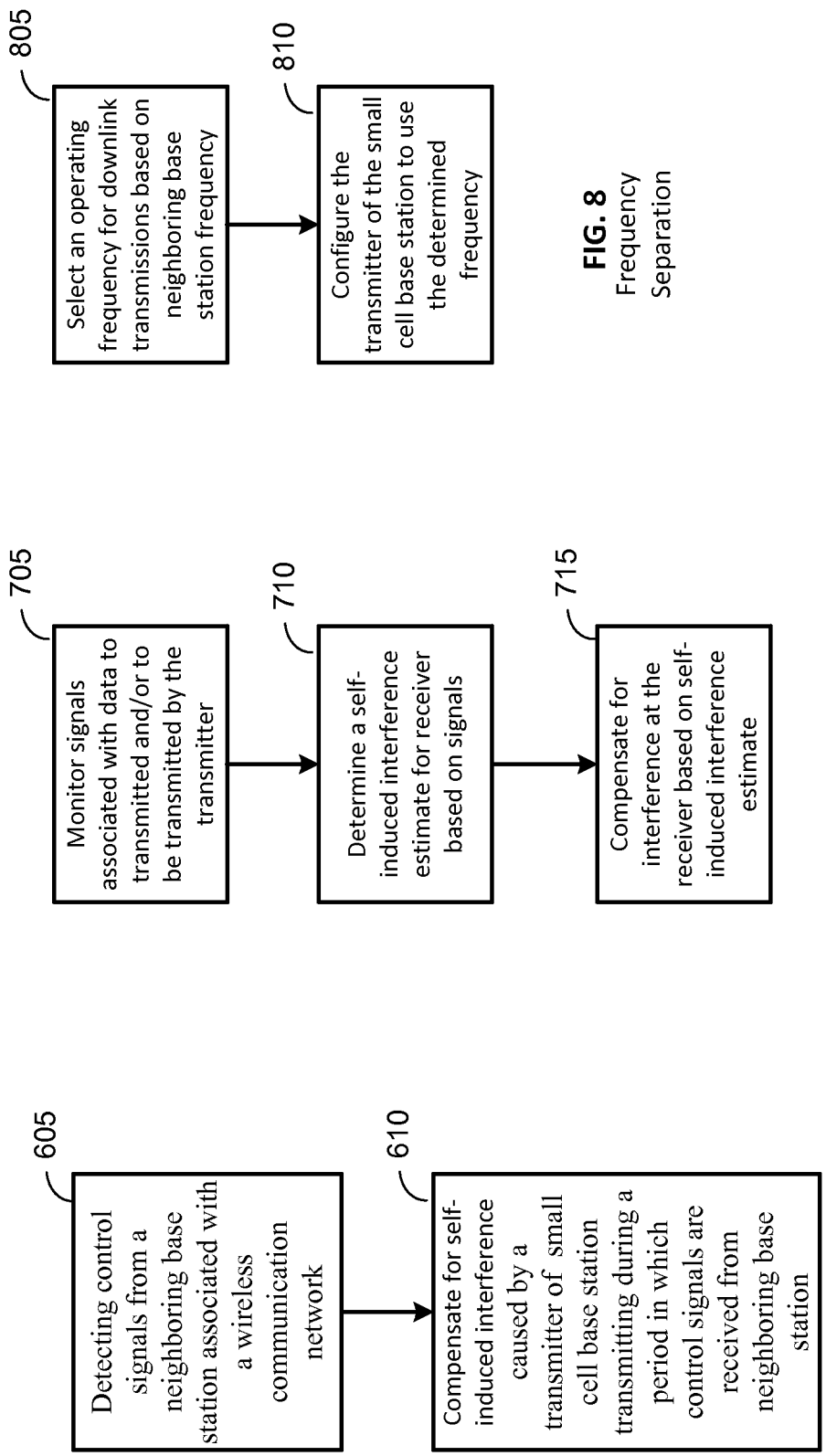
FIG. 6 is a flow diagram of an example process for compensating for self-induced interference that can be used to implement the techniques disclosed herein.
FIG. 7 is a flow diagram of an example process for self-induced interference cancellation that can be used to implement the techniques disclosed herein.
FIG. 8 is a flow diagram of an example process for frequency separation that can be used to implement the techniques disclosed herein.

The small cell base station 115 can use one or more of the following techniques to improve full-duplex communications between the small cell base station 115 and the mobile device 120 while compensating for self-induced interference. One technique that can be used by the small cell base station 115 is self-induced interference cancellation (SELIC), which can facilitate the coexistence of multiple radio technologies and a full-duplex wireless system that uses the same frequency channel at the same time for both transmission and reception. An example implementation of an SELIC technique disclosed herein that can be implemented by the small cell base station 115 is illustrated in FIG. 7.

Figures 11, 12:
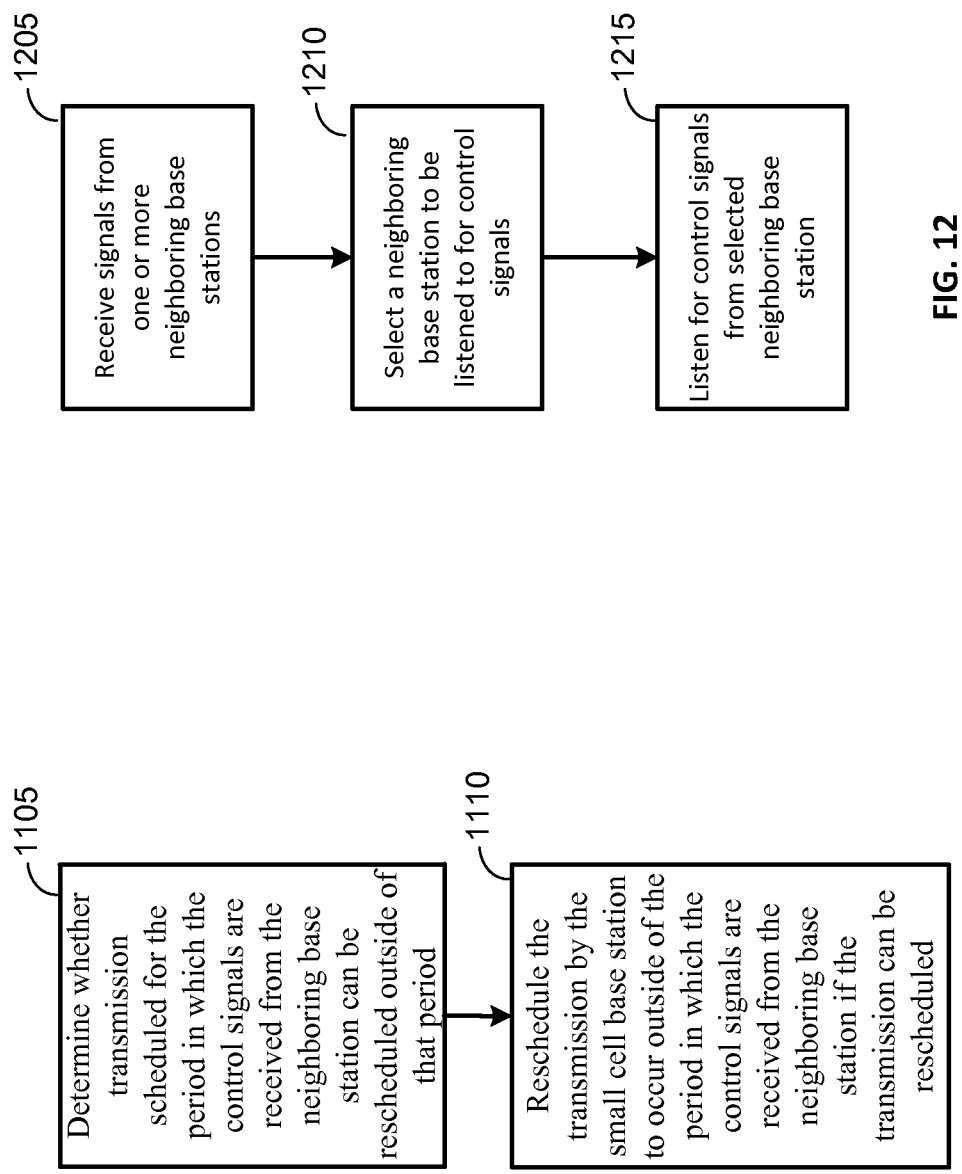
FIG. 11 is a flow diagram of an example process for transmission scheduling that can be used to implement the techniques disclosed herein.
FIG. 12 is a flow diagram of an example process for selecting a neighboring base station to listen to for control signals.

Another set of techniques that can be used by the small cell base station 115 is smart scheduling and frequency separation. The downlink frequencies for the DL1 135 and DL2 145 may be separated to minimize self-interference. The small cell base station 115 can also configured to select its own operating frequency based on the band and the center frequency of the neighboring base station 140 in order to reduce the amount of self-interference on the network. The small cell base station 115 can also be configured to use smart scheduling techniques to determine whether a transmission that is scheduled for a network listen period can be rescheduled for outside of such a period to avoid self-induced interference. An example of the frequency separation techniques disclosed herein that can be implemented by small cell base station 115 is illustrated in FIG. 8, and an example of a smart scheduling technique that can be implemented by small cell base station 115 is illustrated in FIG. 11.

Figure 9:
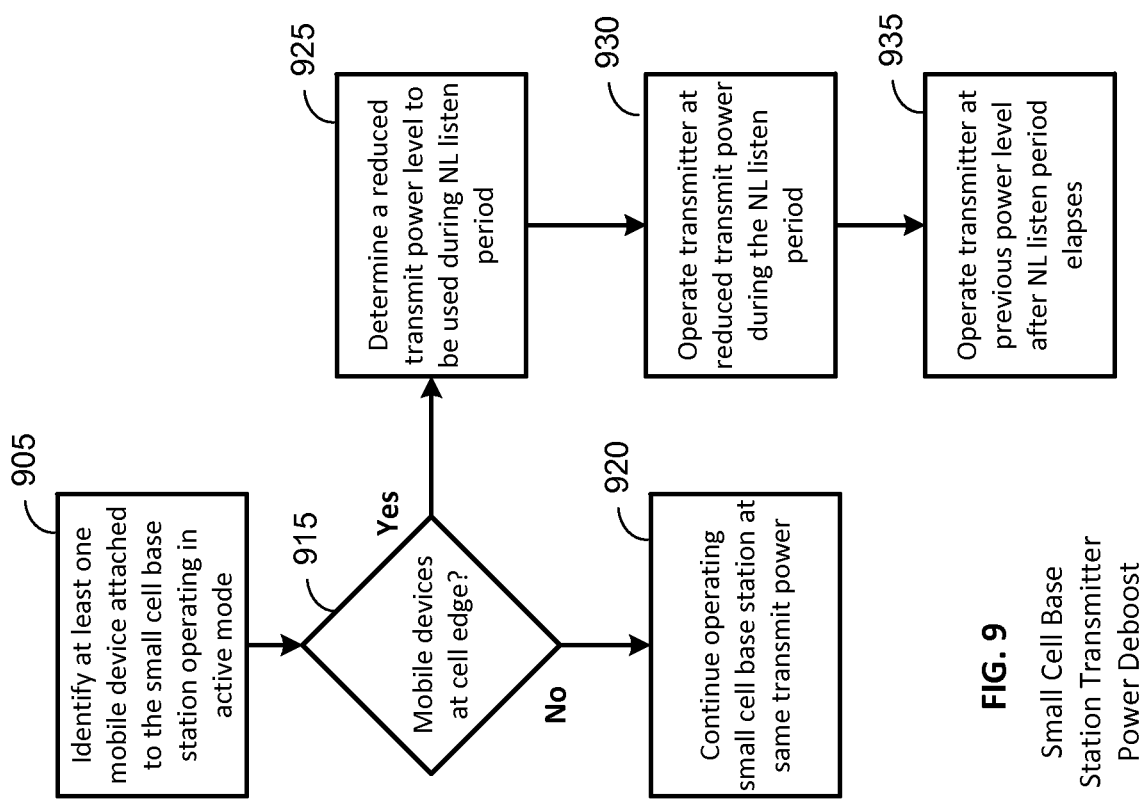
FIG. 9 is a flow diagram of an example process for transmitter power reduction that can be used to implement the techniques disclosed herein.

Another technique that can be used by the small cell base station 115 is controlling transmission power at the small cell base station 115 during network listen periods or other periods where the small cell base station 115 is configured to listen for control signals or other data from the neighboring base station 140. The power of the transmitter of the transmitter 115 can be reduced during concurrent NL and small cell base station 115 downlink operations to reduce the amount of self-induced interference experienced at the receiver of small cell base station 115. This technique is also referred to herein as small cell base station 115 power de-boosting. An example of power control technique is illustrated in FIG. 9.

The example network configuration illustrated in FIGS. 1 and 2 is merely an example of one possible configuration of a network in which the techniques disclosed herein may be implemented. Other network configurations may include additional elements not illustrated in FIGS. 1 and 2 and the various components may be interconnected in a different configuration than what is shown in FIGS. 1 and 2. The hardware illustrated in FIGS. 1 and 2 can be used to implement the example implementations described herein.

Example Hardware

Figure 3:
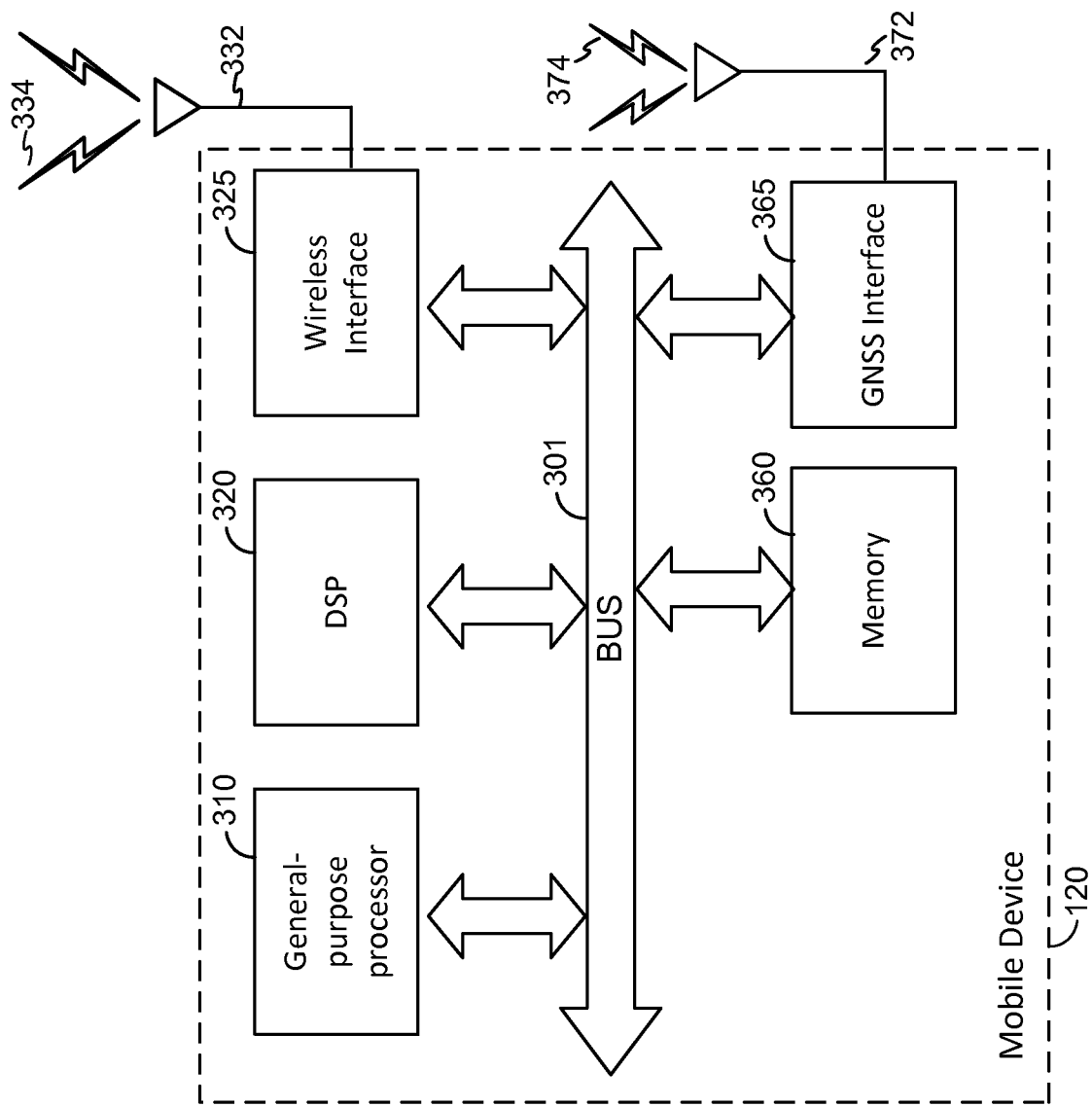
FIG. 3 is a block diagram of a mobile device that can be used to implement the mobile device illustrated in the preceding figures.

FIG. 3 is a block diagram of a mobile device that can be used to implement the mobile device 120 illustrated in the preceding figures. The mobile device 120 comprises a computer system including a general-purpose processor 310, a digital signal processor (DSP) 320, a wireless interface 325, a GPS interface 365, and a non-transitory memory 360, connected to each other by a bus 301. The wireless interface 325 can include a wireless receiver, transmitter, transceiver, and/ or other elements that enable the mobile device 120 to send and/or receive data using the wireless communications protocols associated with one or more wireless wide area network (WWAN) systems. The wireless interface 325 is connected by a line 332 to an antenna 334 for sending and receiving communications to/from the small cell base station 115 and/or other wireless devices configured to communicate using wireless communication protocols. The GNSS interface 365 can include a wireless receiver and/or other elements that enable the mobile device 120 to receive signals from transmitters associated with one or more GNSS systems. The GNSS interface 365 is connected by a line 372 to an antenna 374 for receiving signals from the GNSS transmitters. Mobile device 120 may include one or more transceivers configured to receive and/or send communications using other wireless protocols in addition to or instead of the transceivers illustrated in FIG. 3. DSP 320 can be configured to process signals received from the wireless interface 325 and/or the GNSS interface 365 and may be configured to process signals for or in conjunction with one or more modules implemented as processor-readable, processor-executable software code stored in memory 360 and/or may be configured process signals in conjunction with the processor 310.

The processor 310 can be an intelligent device, e.g., a personal computer central processing unit (CPU) such as those made by Intel® Corporation or AMD®, a microcontroller, an application specific integrated circuit (ASIC), etc. The memory 360 is a non-transitory storage device that can include random access memory (RAM), read-only memory (ROM), or a combination thereof. The memory 360 can store processor-readable, processor-executable software code containing instructions for controlling the processor 310 to perform functions described herein (although the description may read that the software performs the function(s)). The software can be loaded onto the memory 360 by being downloaded via a network connection, uploaded from a disk, etc. Further, the software may not be directly executable, e.g., requiring compiling before execution.

The software in the memory 360 is configured to enable the processor 310 to perform various actions, including implementing sending and/or receiving data from the small cell base station 115.

Figure 4:
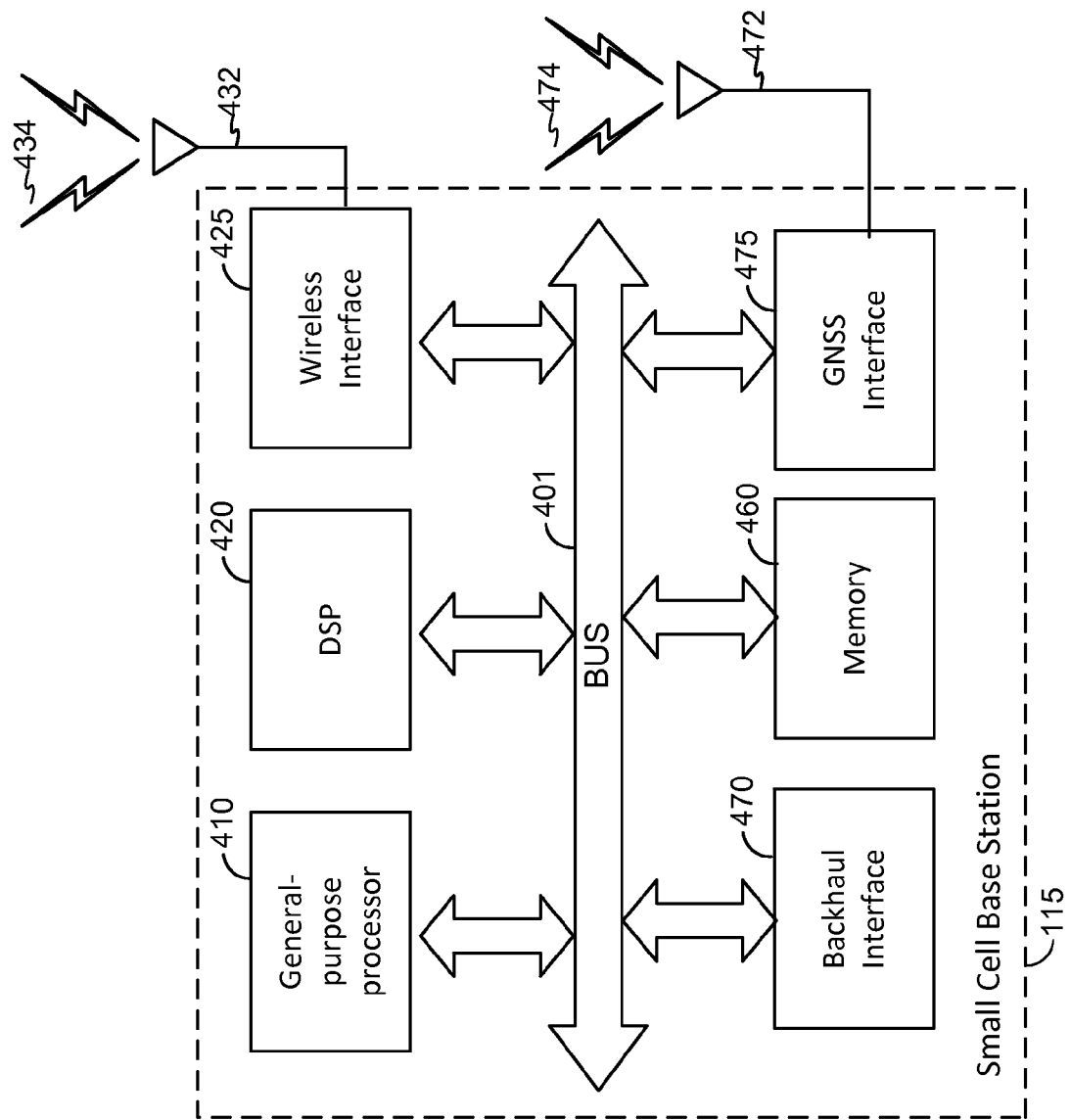
FIG. 4 is a block diagram of a small cell base station that can be used to implement the small cell base station illustrated in the preceding figures.

FIG. 4 is a block diagram of a small cell base station 115 that can be used to implement the small cell base station 115 illustrated in the preceding figures. The small cell base station 115 comprises a computer system including a general-purpose processor 410, a digital signal processor (DSP) 420, a wireless interface 425, a backhaul interface 470, and a non-transitory memory 460, connected to each other by a bus 401. The wireless interface 425 can include a wireless receiver, transmitter, transceiver, and/or other elements that enable the small cell base station 115 to send and/or receive data using wireless communications protocols. For example, the wireless interface can be configured to support the Long Term Evolution (LTE) wireless communications protocols and/or other wireless communications protocols. The wireless interface 425 is connected by a line 432 to an antenna 434 for sending and receiving communications to/from the mobile device 120 and/or other wireless devices configured to communicate using the wireless communication protocols supported by the small cell base station 115. The backhaul interface 470 is provides one or more wired and/or wireless connections to a broadband connection to the network 110. The backhaul interface 470 can be configured to provide connection to a Digital Subscriber Line (DSL), cable service, and/or other types of broad band service. The backhaul interface 470 can be configured to connect to an intermediary device, such as a DSL modem or a cable modem, which in turn provides connectivity to the backhaul network. Accordingly, the backhaul interface 470 can include an Ethernet interface or other interface that provides wired and/or wireless connectivity to the intermediary device.

The processor 410 can be an intelligent device, e.g., a personal computer central processing unit (CPU) such as those made by Intel® Corporation or AMD®, a microcontroller, an application specific integrated circuit (ASIC), etc. The memory 460 is a storage device that includes random access memory (RAM) and read-only memory (ROM). The memory 460 stores processor-readable, processor-executable software code containing instructions for controlling the processor 410 to perform functions described herein (although the description may read that the software performs the function(s)). The software can be loaded onto the memory 460 by being downloaded via a network connection, uploaded from a disk, etc. Further, the software may not be directly executable, e.g., requiring compiling before execution. DSP 420 can be configured to process signals received from the wireless interface 425 and/or the GNSS interface 475 and may be configured to process signals for or in conjunction with one or more modules implemented as processor-readable, processor-executable software code stored in memory 460 360 and/or may be configured process signals in conjunction with the processor 310.

The software in the memory 460 can be configured to perform various actions, including implementing the various techniques for compensating for self-induced interference described herein.

Some implementations of the small cell base station 115 may also include a Global Navigation Satellite System (GNSS) interface 475. The GNSS interface 475 is connected by a line 472 to an antenna 474 for sending and receiving signals from the satellites of one or more GNSS systems. The GNSS interface 475 can be configured to receive and measure signals and determine pseudo-range measurements satellites associated with one or more GNSS systems, such as the Global Positioning System (GPS), the Galileo system, GLONASS system, and/or other GNSS systems. A small cell base station 115 that includes a GNSS interface 475 can be configured to use the GNSS signals as a reference that can be used to maintain tighter frequency and time synchronization of the small cell base station 115.

The small cell base station 115 can also be configured to obtain synchronization information from a network server using Precision Timing Protocol (PTP) via the backhaul interface 470. A small cell base station 115 having a GNSS interface 475 and/or configured to contact a network server using PTP for synchronization information can be configured to broadcast control signals that may be used by other small cell base stations 115 operating at a lower synchronization stratum level.

Figure 5:
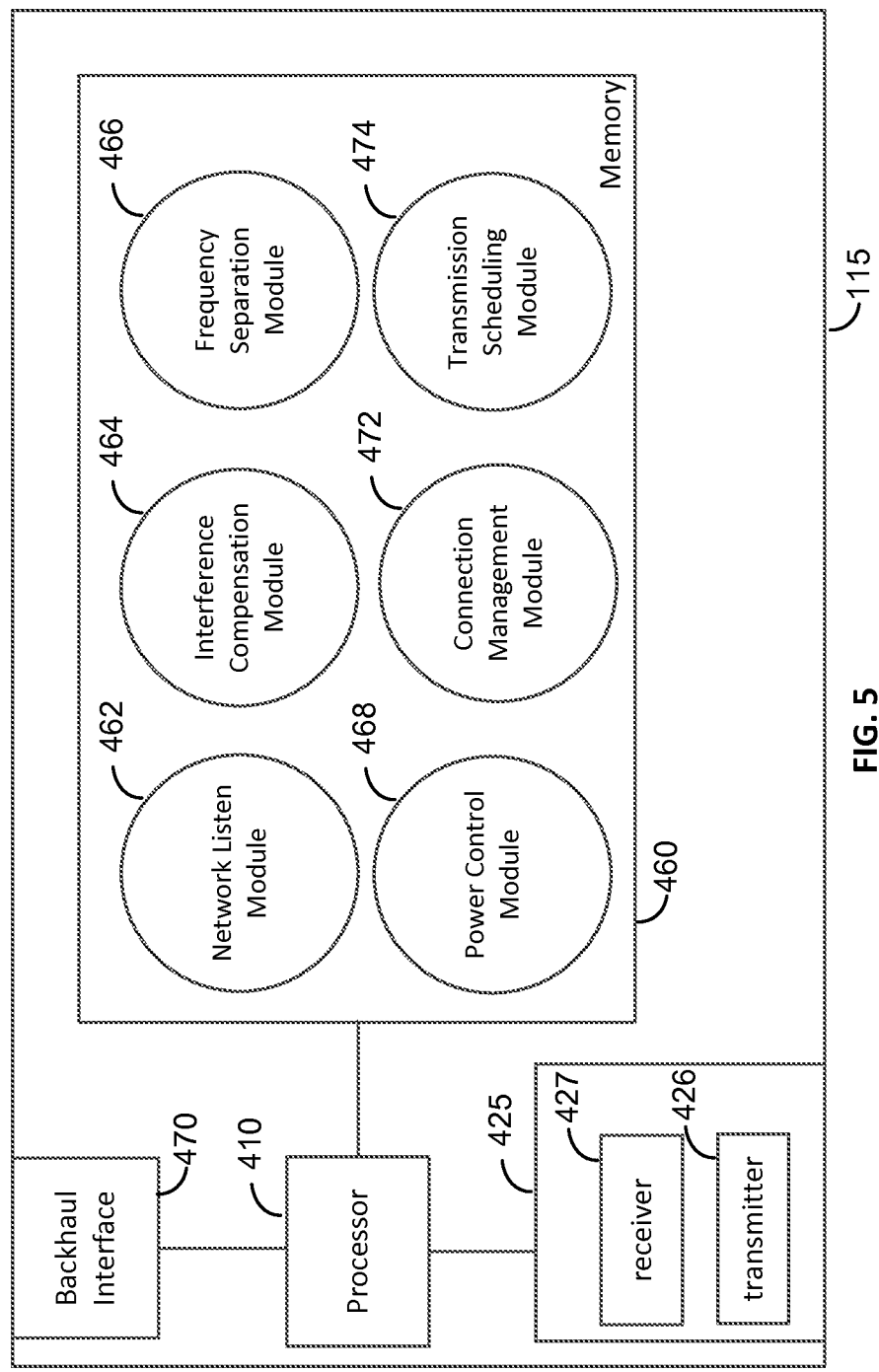
FIG. 5 is a functional block diagram of the small cell base station illustrated in FIG. 4 that illustrates functional modules of a memory shown in FIG. 4.

FIG. 5 is a functional block diagram of the small cell base station 115 illustrated in FIG. 4 that illustrates functional modules of a memory shown in FIG. 4. For example, the small cell base station 115 can include a network listen module 462, an interference compensation module 464, a frequency separation module 466, a power control module 468, a connection management module 472, and a transmission scheduling module 474. The small cell base station 115 may also include one or more additional functional modules that provide other functionality to the small cell base station 115. The small cell base station 115 illustrated in FIGS. 4 and 5 can be used to implement the small cell base station 115s associated with the processes illustrated in FIGS. 6-12.

The network listen module 462 can be configured to detect downlink control signals from the neighboring base station 140. The network listen module 462 can be configured to enable the small cell base station 115 to execute various types of functionality, including, but not limited to: (a) self-organizing network (SON) related applications, such as building a neighbor list, physical cell identity (PCI) selection to avoid PCI collisions with neighboring cells; (b) approximate location determination using cell global identity (CGI) of neighboring base stations; (c) time and frequency synchronization; and (d) interference management. This functionality may be implemented by the network listen module 462 and/or by other modules of the small cell base station 115.

The network listen module 462 can also be configured to compensate for self-induced interference experienced by the receiver 427 that is caused by the transmitter 426. The network listen module 462 can be configured to one or more of the following techniques to compensate for self-induced interference: (1) active interference cancellation, (2) scheduling and frequency compensation, and (3) reducing transmit power levels during network listen periods and other periods of time where it is desirable to reduce self-induced interference (also referred to herein as deboosting). The network listen module 462 can be configured to send a request to the interference compensation module 464 to perform active interference cancellation to compensate for self-induced interference. The network listen module 462 can also be configured to send a request to the frequency compensation module 466 to perform frequency compensation to compensate for self-induced interference. The network listen module 462 can also be configured to send a request to the power control module 468 to adjust the transmit power level of transmitter 426 to compensate for self-induced interference. The network listen module 462 can also be configured to send a request to the transmission scheduling module 474 to reschedule a transmission scheduled during the network listen period or other similar period to avoid causing self-induced interference when possible. The network listen module 462 can be configured to implement the processes illustrated in FIGS. 6 and 12.

The interference compensation module 464 can be configured to compensate for self-induced interference at the small cell base station 115. The interference compensation module 464 can be configured to perform active interference cancellation (AIC) techniques on signals received by the receiver 427 to cancel out interference caused by the transmitter 426. The interference compensation module 462 can be configured to monitor signals transmitted by the transmitter 426 and to generate a signal that can be provided to the receiver 427 that can be used to cancel out at least a portion of the effects of the signals transmitted by the transmitter 426. The AIC technique can be used to reduce and/or substantially eliminate self-induced interference. The AIC technique can be applied during the network listen periods where the network listen module 462 is configured to listen for control signals from the neighboring base station 140. The interference compensation module 464 can be configured to implement the process illustrated in FIG. 7.

The frequency compensation module 466 can be configured to configure the transmitter 426 of the small cell base station 115 to operate using different operating frequency or set of operating frequencies for transmissions than the operating frequency of used by the neighboring base station 140 for downlink transmissions. The frequency compensation module 466 can be configured to implement the process for frequency separation illustrated in FIG. 8.

The transmission scheduling module 474 can be configured to schedule transmissions for the transmitter 426 to reduce or substantially eliminate self-induced interference. For example, the transmission scheduling module 474 can be configured to determine whether a particular transmission scheduled for transmission during the network listen period or other period where the receiver 427 is configured to listen for control signal information or other data from the neighboring base station 140 can be rescheduled for outside of this period. If the transmission can be rescheduled, the transmission scheduling module 474 can be configured to reschedule the transmission for outside of the network listen period or other such period to reduce or eliminate self-induced interference. Some transmissions may not be able to be rescheduled due to QoS requirements or other such constraints, and the transmissions will be scheduled to meet these requirements. The transmission scheduling module 474 can be configured to implement the process illustrated in FIG. 11.

The power control module 468 can be configured to compensate for self-induced interference caused by the transmitter 426 by reducing the transmit power level of the transmitter 426 during the network listen period. The power control module 468 can be configured to determine a reduced transmit power level and to configured the transmitter 426 to operate using that reduced transmit power level during network listen periods or other periods of time where it is desirable to reduce self-induced interference at the small cell base station 115. The power control module 468 can be configured to take into account the distance that mobile devices 120 connected to small cell base station 115 are relative to the small cell base station 115, the power control module 468 can also be configured take into account the signal quality of links between the mobile devices 120 connected to the small cell base station 115, and any Quality of Service (QoS) requirements associated with the connected mobile devices 120 when determining a reduced transmit power level to be used during the network listen period or other periods where it is desirable to reduce or substantially eliminate self-induced interference at the small cell base station 115. The power control module 468 can be configured to implement the processes illustrated in FIGS. 9 and 10.

The connection management module 472 can be configured to send a request for QoS information for a mobile device 120 to the network provider's core network via the backhaul interface 470 when the mobile device 120 connects to the small cell base station 115 120. The connection management module 472 can be configured to receive the QoS information for the mobile device 120 from the core network via the backhaul interface 470. In some implementations, the QoS information for all mobile devices 120 that are connected to the small cell base station 115 can be obtained from the core network. The connection management module 472 can be configured to store the QoS information in the memory 460 or another storage device associated with the small cell base station 115. The power control module 468 can be configured to access the QoS information from the memory 460 or other storage device associated with the memory.

Example Implementations

The following examples illustrate how compensation for self-interference in the small cell base station 115 during network listen periods can be achieved. These example implementations can be implemented using small cell base station 115 illustrated in FIGS. 4 and 5. The small cell base station 115 can be configured to implement the methods illustrated in FIGS. 6-11.

FIG. 6 is a flow diagram of an example process for compensating for self-induced interference that can be used to implement the techniques disclosed herein. The process illustrated in FIG. 6 can be implemented by the network listen module 462 of the small cell base station 115. The network listen module 462 may be assisted by one or more of the interference compensation module 464, the frequency compensation module 466, the power control module 468, and the transmission scheduling module 474.

The process can begin with detecting control signals from a neighboring base station 140 associated with a wireless communication network (stage 605). The control signals may be transmitted by the neighboring base station 140 at regular, predetermined intervals and the network listen module 462 can be configured to listen for the control signals during those predetermined intervals. The neighboring base station 140 can be configured to transmit downlink control signals that can include timing and/or frequency synchronization information. The control signals can be used by the network listen module 462 to correct timing and/or frequency synchronization errors at the small cell base station 115. The network listen module 462 can be configured to listen for these and/or other types of control signals transmitted in-band by the neighboring base station 140.

The process can continue with compensating for self-induced interference caused by the transmitter 426 of the small cell base station 115 transmitting during a period in which control signals are received from the neighboring base station 140 (stage 610). Compensating for the self-induced interference caused by the transmitter 426 of the small cell base station 115 can include one or more of the following techniques: (1) active interference cancellation, (2) transmission scheduling and frequency separation, and (3) reducing transmit power levels used the transmitter 426 during network listen periods and other periods of time where it is desirable to reduce self-induced interference. An example process for active interference cancellation is provided in FIG. 7, an example process for frequency separation is provided in FIG. 8, an example process for reducing transmit power levels during network listen periods and other periods of time where it is desirable to reduce self-induced interference is provided in FIG. 9, and an example process for transmission scheduling is provided in FIG. 11.

FIG. 7 is a flow diagram of an example process for self-induced interference cancellation that can be used to implement the techniques disclosed herein. The process illustrated in FIG. 7 can be implemented by the interference compensation module 464 of the small cell base station 115. The process illustrated in FIG. 7 can be used to implement at least a portion of stage 610 of the process illustrated in FIG. 6. The process illustrated in FIG. 7 may be executed in response to a signal from the network listen module 462 or may be scheduled to be executed automatically by the interference compensation module 464 automatically prior to a network listen period and/or other periods of time where it is desirable to reduce self-induced interference at the small cell base station 115. In some implementations, the interference compensation module 464 may be configured to perform technique illustrated in FIG. 7 at any time that the transmitter 426 transmits data.

The transmitter 426 and the receiver 427 of the small cell base station 115 can be configured to use the same frequency channel for both transmission of data and the reception of data. As a result, the transmitter 426 can cause interference in the receiver 427 if the transmitter 426 transmits data at the same time that receiver 427 is receiving data. One situation where this scenario can occur if the transmitter 426 is transmitting data to the mobile device 120 on the downlink channel 135 while the receiver is receiving data from the base station 145 via the downlink channel 145. This can occur if the small cell base station 115 transmits data to the mobile device 120 during the network listen period where the network listen module 462 of the small cell base station 115 is trying to detect control signals begin transmitted by the neighboring base station 140.

The signals transmitted and/or to be transmitted by the transmitter 426 can be monitored (stage 705). The interference compensation module 464 can be configured to actively monitor the signals transmitted and/or about to be transmitted at the base band (BB), Radio Frequency (RF), or simultaneously in the BB and the RF. The wireless interface 425 can be configured to provide an output signal to the interference compensation module 464. The signal can include waveform information that the interference compensation module 464 can use to estimate the self-induced information at the receiver 427. For example, the wireless interface 425 can be configured to send BB and/or RF information to the interference compensation module 464 via the bus 401. In some implementations, the interference compensation module 464 may be implemented in the wireless interface 425 as hardware and/or software and the wireless interface 425 may include a processor and a memory. The transmitter 426 can be configured to include one or more output lines that can output the Base Band and/or RF signal information to the interference compensation module 464.

A self-induced interference estimate of the interference caused by the transmitter 426 at the receiver 427 can then be determined (stage 710). The interference compensation module 464 can be configured to estimate the self-induced interference caused by the transmitter 426 at the receiver 427 based on the Base Band and/or RF signal information from the wireless interface 425. In implementations where the compensation is performed in the RF domain, a reference signal can be provided from the transmitter to the receiver using a coupling device at the transmitter. The compensation module 464 can use this signal information to estimate the self-induced interference in the RF domain using this signal. In implementations where the compensation is performed in the Base Band domain, a reference signal can be output from the transmitter before the digital-to-analog converter (DAC) and provided to the receiver for estimating the self-induced interference caused by the transmitter in the BB domain.

The estimated interference can then be compensated for at the receiver 427 based on the self-induced interference estimate (stage 715). The interference compensation module 464 can be configured to generate BB and/or RF signals that can be provided to the receiver 427 and the receiver 427 can use the BB and/or RF signals to cancel out the self-induced interference. The interference compensation module 464 can be configured to select from several active interference cancellation (AIC) techniques to compensate for the self-induced interference at the receiver 427. The interference compensation module 464 can be configured to select a particular technique based on the severity of the self-induced interference estimated by the interference compensation module 464 and whether the compensation is most likely to be affective at the BB, the RF, or both. For example, the interference compensation module 464 can be configured to generate BB AIC signals and provide the signals to the receiver 427 for canceling the effects of the self-induced interference if the low-noise amplifier (LNA) and the analog-to-digital converter (ADC) of the receiver 427 are not saturated. The interference compensation module 464 can be configured to make this determination based on signal information output by the receiver 427. If the interference compensation module 464 determines that the LNA and/or the ADC of the transmitter are saturated, the interference compensation module 464 can be configured to generate RF AIC signals and provide the signals to the receiver 427 for canceling the effects of the self-induced interference. The interference compensation module 464 can also be configured to generate both BB and RF AIC signals and to provide the BB and RF AIC signals to the transmitter 426 to compensate for self-induced interference. In some implementations, the interference compensation module 464 can be configured to determine whether to use BB-based cancellation, RF-based cancellation, or a combination thereof based on the required cancellation depth and the receiver power headroom (the received power versus the maximum support in-band power at the LNA and the ADC). The digital interference cancellation at the BB domain may be unable to handle a large amount of interference caused by a strong transmission signal located very close to the receiver. For example, if the dynamic range of the receiver is saturated with strong self-induced interference, the interference compensation module 464 can be configured to use RF-based interference cancellation to bring the receiver signal level down and to use BB-based interference cancellation to handle the residual self-induced interference.

FIG. 8 is a flow diagram of an example process for frequency separation that can be used to implement the techniques disclosed herein. The process illustrated in FIG. 8 can be implemented by the frequency separation module 466 of the small cell base station 115. The process illustrated in FIG. 8 can be used to implement at least a portion of stage 610 of the process illustrated in FIG. 6. The process illustrated in FIG. 8 may be executed in response to a signal from the network listen module 462 or may be scheduled to be executed automatically by the frequency separation module 466 automatically prior to a network listen period and/or other periods of time where it is desirable to reduce or substantially eliminate self-induced interference at the small cell base station 115. In some implementations, the interference compensation module 464 may be configured to perform technique illustrated in FIG. 8 at any time that the transmitter 426 transmits data. The frequency separation module 466 can be configured to perform frequency separation, such as in stages 805 and 810 of the process illustrated in FIG. 8, to reduce the effects of self-induced interference. The use of these techniques can allow for simultaneous uplink and downlink transmissions to occur at the mobile device 120, as self-induced interference experienced by the receiver 427 of the small cell base station 115 and caused by the transmitter 426 of the small cell base station 115 can be reduced or substantially eliminated. Furthermore, because the transmitter 426 is not precluded from transmitting downlink communications during network listen periods and/or other such periods where the receiver 427 is listening for control signals or other data from the neighboring base station 140.

An operating frequency for transmissions by the small cell base station 115 can be selected based on the downlink frequency used by the neighboring base station 140 (stage 805). The frequency separation module 466 can be configured to select different operating frequencies for the receiver 427 of the small cell base station 115 and the transmitter 426 of the small cell base station 115. For example, the small cell base station 115 may be configured to support Carrier Aggregation, which is available in some LTE network implementations. Carrier Aggregation allows a segment of bandwidth, referred to an aggregated carrier, to be divided into multiple Component Carriers each comprising a range of frequencies that comprise the segment of bandwidth that make up the aggregated carrier. If the neighboring base station 140 is configured to transmit control signals or other data using a first Component Carrier, the frequency separation module 466 can be configured to configure the transmitter 426 of the small cell base station 115 to use a different component carrier for downlink transmissions. In a preferred implementation, the operating frequency or range of operating frequencies selected for the transmitter 426 will be separate from the operating frequency or range of frequencies used by the neighboring base station 140 to transmit the control signals and/or other data that the small cell base station 115 such that self-induced interference experienced by the receiver 427 and caused by the transmitter 426 is reduced or substantially reduced. In some implementations, the selected operating frequency may comprise a range of frequencies and may also comprise a set of non-contiguous ranges of frequencies on which the small cell base station 115 may transmit downlink data. The small cell base station 115 can be configured to operate in a certain frequency band which includes many carrier frequencies. The small cell base station 115 can be configured to determine the carrier frequency that the small cell base station 115 can use for downlink transmission based on the detected carrier frequency used by the neighboring base station 140.

The transmitter 426 can then be configured to operate using the selected operating frequency (stage 810). The frequency separation module 466 can be configured to configure the transmitter to use the selecting operating frequency 464. The scheduling and frequency module 464 can be configured to configure the transmitter 426 of the small cell base station 115 operate using the selected frequency during network listen periods and/or other such periods where the receiver 427 is listening for control signals or other data from the neighboring base station 140. In some implementations, the frequency separation module 466 can be configured to make the determination of stage 805 when the small cell base station 115 is powered up. In some implementations, the frequency separation module 466 can be configured to configure the transmitter 426 to operate that the selected frequency at all times. In other implementations, the frequency separation module 466 can be configured to configure the operating frequency of the transmitter 426 to use the selected operating frequency during network listen periods and/or other such periods where the receiver 427 is listening for control signals or other data from the neighboring base station 140.

Downlink transmissions can also be scheduled to avoid network listen periods and other periods of time wherein the receiver 427 is listening for control signals or other information from the neighboring base station 140 (stage 815). The frequency separation module 466 can be configured to schedule downlink transmission to mobile devices 120 connected to the small cell base station 115 to avoid transmitting during network listen periods and/or other such periods where the receiver 427 is listening for control signals or other data from the neighboring base station 140 when possible to help reduce or substantially eliminate self-induced interference. In some situations, it may not be possible to schedule transmissions to avoid the network listen period or other such periods, due to QoS requirements or other such constraints, and the transmissions will be scheduled to meet these requirements.

FIG. 9 is a flow diagram of an example process for transmitter power reduction that can be used to implement the techniques disclosed herein. The process illustrated in FIG. 9 can be implemented by the power control module 468 of the small cell base station 115. The process illustrated in FIG. 9 can be used to implement at least a portion of stage 610 of the process illustrated in FIG. 6. The process illustrated in FIG. 9 may be executed in response to a signal from the network listen module 462 or may be scheduled to be executed automatically by the power control module 462 automatically prior to one or more network listen periods or other periods of time where the receiver 427 is listening for signals from the neighboring base station 140.

In some embodiments, the process illustrated in FIG. 9 may be preceded by determining what transmit power control capabilities the small cell base station 115 has for controlling the transmit power level of the transmitter 426 of the wireless interface 425. In some implementations, this determining stage may be performed at the time that the small cell base station 115 is powered up or prior to entering a network listen period or other similar period where the receiver 427 is configured to listen for control signals or other data from the neighboring base station 140. In some implementations, the transmit power of the transmitter 426 may not be configurable and the transmitter 426 can be switched off or switched on to transmit at full power. In such implementations, the power control module 468 can be configured to send a signal to the network listen module 462 in response to a power control request from the power control module 468 that indicates that the power level of the transmitter 426 of the small cell base station 115 is not configurable. In embodiments where the power level of the transmitter 426 is configurable, the power control module 468 can be configured to perform the process illustrated in FIG. 9.

Mobile devices operating in active mode that are attached to the small cell base station 115 can be identified (stage 905). The power control module 468 of the small cell base station 115 determine whether there are any mobile devices 120 currently connected to the small cell base station 115 that are operating in the active mode. If there are not any mobile devices 120 operating in the active mode attached to the small cell base station 115, the power control module 468 can be configured to skip to stage 925 of the process.

A determination can be made whether any mobile devices are located at the edge of the effective cell radius of the small cell base station 115 that would be affected by the lower power transmit mode (deboost) (stage 915). If the power control module 468 lowers the transmission power of the small cell base station 115 by deboosting, the effective cell radius of the small cell base station 115 is reduced while the transmitter is being operated at the lower transmission power. Mobile devices 120 located at the edge of the effective cell radius of the small cell base station 115 before deboosting may no longer be able to detect the transmissions from the small cell base station 115 when the small cell base station 115 is operating at the lower transmission power. If If the power control module 468 determines that one or more mobile devices 120 are located at or near the effective cell radius of the small cell base station 115 prior to deboosting, the power control module 468 can be configured to continue operating the transmitter 426 of the small cell base station 115 at the same power level that the transmitter 426 was being operated at prior to the determination (stage 920). Otherwise, one or more of the devices 120 currently operating at or near the effective cell radius of the small cell base station 115 may lose connectivity with the small cell base station 115 if the transmitter power is reduced. Furthermore, in some instances, the power control module 468 may not be able to reduce the transmit power level of the transmitter 426 due to QoS requirements or other similar constraints on the service level provided to the mobile devices 120 connected to the small cell base station 115.

If the power control module 468 determines that no mobile devices 120 are located at or near the effective cell radius of the small cell base station 115 prior to deboosting, the power control module 468 can be configured to determine a reduced transmit power to be used during the network listen period (stage 925). The determination can be made for the next network listen period or may be determined for multiple network listen periods over a predetermined period of time. The power control module 468 can be configured to determine a reduced power transmit level for the transmitter 426 based on various factors, such as any Quality of Server (QoS) requirements associated with the one or more mobile device 120 connected to the small cell base station 115, the relative distance that the mobile devices 120 are from the small cell base station 115, the proximity to and interference from the neighboring base station 140 or other small cells whose coverage areas overlap that of small cell base station 115. An example process that can be used for determining a reduced transmit power to be used by the transmitter 426 of the small cell base station 115 is illustrated in FIG. 10.

The transmitter 426 can then be operated at the reduced transmit power during the network listen period (stage 930). The power control module 468 can be configured to configure the transmitter 426 of the small cell base station 115 to operate at the reduced transmit power level determined in stage 925 for the duration of the network listen period.

The transmitter 426 can then be operated at the previous power level that the transmitter 426 was operating at prior to the network listen period once the network listen period elapses (stage 935). The power control module 468 can be configured to configure the transmitter 426 of the small cell base station 115 to operate at the transmit power level that the transmitter was operating at prior to stage 930. In some implementations, the power control module 468 can be configured to configure the transmitter 426 of the small cell base station 115 to operate at maximum transmit power in stage 935. In other implementations, the power control module 468 can be configured to configure the transmitter 426 of the small cell base station 115 at predetermined transmit power level other than at the maximum transmit power level.

Figure 10:
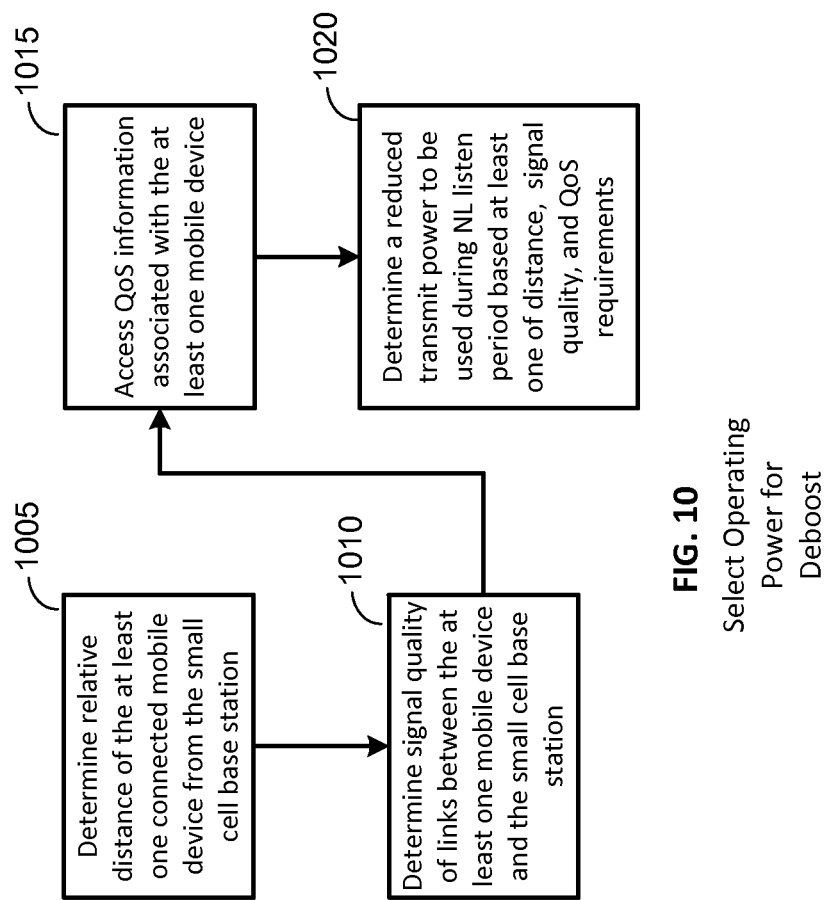
FIG. 10 is a flow diagram of an example process for determining a reduced power level for a transmitter that can be used to implement the process illustrated in FIG. 9.

FIG. 10 is a flow diagram of an example process for determining a reduced power level for a transmitter that can be used to implement the process illustrated in FIG. 9. The process illustrated in FIG. 10 can be implemented by the power control module 468 of the small cell base station 115, and the process of FIG. 10 can be used to implement stage 925 of the process illustrated in FIG. 9.

The relative distance between the small cell base station 115 and the mobile device 120 connected to the small cell base station 115 can be determined (stage 1005). The power control module 468 can be configured to determine the relative distance between the small cell base station 115 and the mobile devices 120 connected to the small cell base station 115. A small cell, such as a small cell base station 115, typically has a limited coverage area compared to a typical macrocell base station, such as base station 140. The farther a mobile device 120 is from the small cell base station 115 the more likely that a drop in transmit power could affect the service provided to the mobile device 120. Such a drop in transmitter power could cause the signal quality of the downlink between the small cell base station 115 and the mobile device 120 to fall below an acceptable level. Furthermore, the signal strength of the downlink signals received at the mobile device 120 may become too weak for the mobile device 120 to decode and process. The power control module 468 can be configured to obtain position information from a location server or from the mobile device itself and to determine the relative distance between the mobile device and the small cell base station 115 based on the position of the two devices. In other implementations, the power control module 468 can be configured to determine the relative distance by one or more signaling means. For example, the small cell base station 115 can be configured to use RSSI (received signal strength indication), RTT (round-trip time), time of arrival (TOA), and/or other signal techniques to determine the relative distance that each mobile device 120 is from the small cell base station 115.

Signal quality for links between the small cell base station 115 and the one or more mobile devices 120 connected to the small cell base station 115 can be determined (stage 1010). The power control module 115 can be configured to receive information about the signal quality links between the small cell base station 115 and the at least one or more mobile devices 120 connected to the small cell base station 115. The one or more mobile devices 120 can be configured to report signal quality information for downlink channels to the small cell base station 115. The wireless interface 425 can be configured to receive this information and to provide the information to the power control module 425. The power control module 468 can be configured to boost the transmit power if the signal to noise ratio for the downlink channels to one or more of the mobile devices 120 connected to small cell base station 115 increases above a predetermined level. The power control module 425 can be configured to determine how much the transmit power of the transmitter 426 may be reduced without increasing the signal to noise ratio for the downlink channels to one or more of the mobile devices 120 connected to small cell base station 115 increases above the predetermined level.

Quality of service information associated with the one or more mobile device connected to the small cell base station 115 can be accessed (stage 1015). A mobile device 120 connected to the small cell base station 115 may have QoS information associated with that mobile device 120 that requires the small cell base station 115 provide a specified level of service to that mobile device 120. The QoS information may be provided to the small cell base station 115 by the network service provider with which the small cell base station 115 is associated. The network service provider may contract with the subscriber to provide a certain level of service to the mobile device 120 when the mobile device 120 is connected to base station affiliated with that network service provider. This QoS information may also apply to small cell base stations, such as small cell base station 115. The power control module 468 can be configured to take the QoS information into consideration before decreasing the transmit power level of the transmitter 426, which could negatively impact the service provided to the one or more mobile devices 120 connected to the small cell base station 115. The QoS information may specify various requirements that the small cell base station 115 is required to meet with respect to particular mobile device 120. For example, the small cell base station 115 may be required to assign a high priority to certain types of data traffic (e.g., call data or streaming video content). The small cell base station 115 may also be required to provide a dedicated amount of bandwidth to a mobile device 120 and/or to control latency and/or jitter for data streams associated with real-time content.

A reduced transmit power to be used during the network listen period can be determined (stage 1020). The reduced transmit power to be used can be determined based on at least one of the distance, the signal quality, and the quality of service information (if any). The power control module 468 of the small cell base station 115 can be configured to determine a reduced transmit power level that the transmitter 426 of the small cell base station 115 can be operated at during the network listen period. The power control module 468 can be configured to determine whether the transmitter 426 of the small cell base station 115 is configurable to operate at different transmit power level and to determine a reduced transmit power level based on the capabilities of the transmitter 426. For example, the transmitter 426 of some small cell base stations 115 may be configurable to operate at a number of predetermined transmit power level modes, such as a high transmit power mode, a medium transmit power mode, a low transmit power mode, and a transmitter off mode. When operating in the high transmit power mode, the transmitter 426 is configured to operate at a maximum transmit power level. When operating in the medium transmit power mode, the transmitter operates at transmit power level that is less than the maximum power level but is greater than the low transmit power level. Finally, when operating in the low transmit power mode, the transmitter 426 can be configured to operate at a transmit power that is greater than zero (the transmitter off mode) but less than the transmit power that the transmitter is configured to operate at when operating in the medium transmit power mode. In other embodiments, the transmitter 426 may be configured to adjust the power in a more flexible scale.

FIG. 11 is a flow diagram of an example process for scheduling transmissions at the small cell base station 115 that can be used to implement the techniques disclosed herein. The process illustrated in FIG. 11 can be implemented by the transmission scheduling module 474 of the small cell base station 115. The process illustrated in FIG. 11 can be used to implement at least a portion of stage 610 of the process illustrated in FIG. 6. The process illustrated in FIG. 11 may be executed in response to a signal from the network listen module 462 or may be scheduled to be executed automatically by the scheduling module 466 automatically to avoid scheduling transmissions by the small cell base station 115 during a network listen period and/or other periods of time where it is desirable to reduce or substantially eliminate self-induced interference at the small cell base station 115.

A determination can be made whether a transmission scheduled for a network listen period or other period where the receiver 427 is configured to listen for control signal information or other data from the neighboring base station 140 can be rescheduled for outside of this period (stage 1105). The transmission by the small cell base station 115 can then be rescheduled to occur outside of the period in which the control signals are received from the neighboring base station 140 if the transmission can be rescheduled (stage 1110). The transmission scheduling module 474 can be configured to schedule downlink transmission to mobile devices 120 connected to the small cell base station 115 to avoid transmitting during network listen periods and/or other such periods where the receiver 427 is listening for control signals or other data from the neighboring base station 140 when possible to help reduce or substantially eliminate self-induced interference. The frequency separation module 466 can also be configured to schedule uplink transmissions to the neighboring base station 140 to avoid network listen periods and/or other such periods where the receiver 427 is listening for control signals or other data from the neighboring base station 140 whenever possible to help reduce or substantially eliminate self-induced interference. In some situations, it may not be possible to reschedule scheduled transmissions to avoid the network listen period or other such periods, due to QoS requirements or other such constraints, and the transmissions will be scheduled to meet these requirements.

FIG. 12 is a flow diagram of an example process for selecting a neighboring base station from which to listen for control signals. The process illustrated in FIG. 12 can be implemented by the network listen module 462 of the small cell base station 115. The network listen module 462 may be assisted by one or more additional modules or components of the small cell base station 115. The process illustrated in FIG. 12 can be performed at the time that the small cell base station 115 powers up and can be performed before the process illustrated in FIG. 6 to select a neighboring base station from which the small cell base station 115 will listen for control signals.

The process can begin with detecting control signals from one or more neighboring base stations 140 (stage 1205). The neighboring base stations 140 may be macrocell base stations and/or other small cell base stations that have coverage areas in which the small cell base station 115 is located.

A neighboring base station can then be selected to be listened to for control signals (stage 1210). The network listen module 462 can be configured to select a neighboring base station 140 from the one or more neighboring base stations. In some implementations, the network listen module 462 can be configured to rank the neighboring base stations based one or more ranking criteria. For example, the network listen module 462 can be configured to rank the neighboring base stations on one or more of the following ranking criteria: (1) the signal strength of the signals received from the neighboring base station at the small cell base station 115, (2) the frequency separation of the downlink frequencies used by the neighboring base station 140 and the small cell base station 115, (3) signal quality of the signals received from the neighboring base station at the small cell base station 115, and (4) the stratum level advertised by the neighboring base station. The network listen module 462 can be configured to rank the neighboring base stations based on other criteria in addition to or instead of the example criteria described above. In some implementations, a network provider associated with the small cell base station 115 can provide the ranking criteria that the network listen module 462 can use to rank the one or more neighboring base stations. In some implementations, the network provider may configure the small cell base station 115 prior to the small cell base station 115 being deployed, and the ranking criteria may, for example, be stored in the memory 460 of the small cell base station 115. In some implementations, the network listen module 462 can be configured to request the ranking criteria from the network provider or to obtain the ranking criteria from a network entity associated with the network provider. After ranking the neighboring base stations 140, the network listen module 462 can be configured to select a neighboring base station that the network listen module 462 will listen to for control signals based on the ranking.

Control signals from the selected neighboring base station can then be listened for the small cell base station 115 (stage 1215). The network listen module 462 can be configured to listen for control signals from the selected neighboring base station using the downlink frequency used by the neighboring base station and can be configured to listen for the control signals from the selected neighboring base station at a predetermined interval at which the selected neighboring base station transmits the control signals. The network listen module 462 can receive and decode the control signals and use the control signals to perform various action, including, but not limited to: (a) self-organizing network (SON) related applications, such as building a neighbor list, physical cell identity (PCI) selection to avoid PCI collisions with neighboring cells; (b) approximate location determination using cell global identity (CGI) of neighboring base stations; (c) time and frequency synchronization; and (d) interference management. This functionality may be implemented by the network listen module 462 and/or by other modules of the small cell base station 115, and the network listen module 462 can be configured to provide the control signals and/or information derived therefrom to other modules and/or components of the small cell base station 115.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for compensating for interference in a small cell base station, the method comprising:
  receiving, by the small cell base station, control signals from a neighboring base station associated with a wireless communication network, the control signals being transmitted by the neighboring base station at predetermined intervals; and
  compensating for self-induced interference in signals received by the small cell base station, caused by a transmitter of the small cell base station transmitting data during the predetermined intervals in which control signals are being received by the small cell base station from the neighboring base station;

wherein the predetermined intervals comprise periods in which the small cell base station listens for and is able to receive control signals from the neighboring base station, and wherein the compensating for self-induced interference is conducted during the periods, while the small cell base station receives control signals.

2. The method of claim 1, further comprising transmitting, with a transmitter of the small cell base station, data to one or more mobile devices, including continuing transmitting data to the one or more mobile devices concurrently as control signals are being received by the small cell base station during one or more of the predetermined intervals.

3. The method of claim 1, further comprising:
deriving from the control signals time and frequency synchronization information; and
synchronizing timing of the small cell base station and a frequency used by the small cell base station based on the time and frequency synchronization information.

4. The method of claim 1 wherein compensating for the self-induced interference caused by the transmitter of the small cell base station further comprises:
monitoring signals associated with data to be transmitted by the transmitter of the small cell base station;
determining self-induced interference estimate for the receiver based on the signals associated with the data to be transmitted; and
compensating for the self-induced interference based on the self-induced interference estimate.

5. The method of claim 4 wherein compensating for the self-induced interference based on the self-induced interference estimate further comprises:
generating a radio frequency signal based on the self-induced interference estimate to cancel out the self-induced interference at the receiver; and
providing the radio frequency signal to a receiver of the small cell base station.

6. The method of claim 1, further comprising:
receiving signals from a plurality of neighboring base stations;
selecting the neighboring base station from the plurality of base stations based on the signals received from the plurality of neighboring base stations; and
detecting the control signals from the selected neighboring base station.

7. The method of claim 6 wherein selecting the neighboring base station from the plurality of base stations based on the signals received from the plurality of neighboring base stations further comprises ranking the neighboring base stations based on one or more ranking criteria.

8. The method of claim 7 wherein the one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station.

9. The method of claim 1 wherein the small cell base station is configured to operate using a different downlink frequency than the neighboring base station.

10. The method of claim 1 wherein compensating for the self-induced interference caused by the transmitter of the small cell base station further comprises:
identifying at least one mobile device attached to the small cell base station;
determining whether any of the at least one mobile device attached to the small cell base station is near the edge of a cell coverage area provided by the small cell base station; and
determining a reduced transmit power level at which to operate the small cell base station during the period in which control signals are received from the macrocell if none of the at least one mobile device attached to the small cell base station is near the edge of the cell coverage area.

11. The method of claim 10 further comprising:
operating the small cell base station transmitter at the reduced power level during the period in which control signals are received from the macrocell.

12. The method of claim 10 wherein determining the reduced transmit power level at which to operate the small cell base station during the period in which control signals are received from the macrocell further comprises:
determining a relative distance of the at least one mobile device from the small cell base station;
determining a signal quality of communication links between the at least one mobile device;
accessing quality of service (QoS) information associated with the at least one mobile device; and
determining the reduced transmit power level at which to operate the small cell base station based on at least one of the relative distance, the signal quality, and the QoS information.

13. A method for compensating for interference in a small cell base station, the method comprising:
detecting control signals from a neighboring base station associated with a wireless communication network, the control signals being transmitted by the neighboring base station at predetermined intervals;
compensating for self-induced interference caused by a transmitter of the small cell base station transmitting during the predetermined intervals in which control signals are received from the neighboring base station and the transmitter of the small cell base station is transmitting data;
deriving from the control signals time and frequency synchronization information; and synchronizing timing of the small cell base station and a frequency used by the small cell base
station based on the time and frequency synchronization information;
wherein the neighboring base station comprises a base station having a more accurate time and frequency reference than the small cell base station.

14. A method for compensating for interference in a small cell base station, the method comprising:
detecting control signals from a neighboring base station associated with a wireless communication network, the control signals being transmitted by the neighboring base station at predetermined intervals;
compensating for self-induced interference caused by a transmitter of the small cell base station transmitting during the predetermined intervals in which control signals are received from the neighboring base station and the transmitter of the small cell base station is transmitting data;

monitoring signals associated with data to be transmitted by the transmitter of the small cell base station; and determining self-induced interference estimate for the receive based on the signals associated with the data to be transmitted;

wherein compensating for the self-induced interference is based on the self-induced interference estimate and further comprises:

generating a baseband signal based on the self-induced interference estimate to cancel out the self-induced interference at the receiver; and providing the baseband signal to a receiver of the small cell base station.

15. A method for compensating for interference in a small cell base station, the method comprising:

detecting control signals from a neighboring base station associated with a wireless communication network, the control signals being transmitted by the neighboring base station at predetermined intervals;

compensating for self-induced interference caused by a transmitter of the small cell base station transmitting during the predetermined intervals in which control signals are received from the neighboring base station and the transmitter of the small cell base station is transmitting data;

wherein compensating for the self-induced interference caused by the transmitter of the small cell base station further comprises:

determining whether a transmission by the small cell base station scheduled for the period in which the control signals are received from the macrocell can be rescheduled outside of the period in which the control signals are received from the macrocell; and rescheduling the transmission by the small cell base station to occur outside of the period in which the control signals are received from the macrocell if the transmission can be rescheduled.

16. An apparatus for compensating for interference in a small cell base station, the apparatus comprising:

means for receiving, by the small cell base station, control signals from a neighboring base station associated with a wireless communication network, the control signals being transmitted by the neighboring base station at predetermined intervals; and means for compensating for self-induced interference in signals received by the small cell base station, caused by a transmitter of the small cell base station transmitting data during the predetermined intervals in which control signals are being received by the small cell base station from the neighboring base station;

wherein the predetermined intervals comprise periods in which the small cell base station listens for and is able to receive control signals from the neighboring base station, and wherein the means for compensating comprises means for compensating for self-induced interference during the periods, while the small cell base station receives control signals.

17. The apparatus of claim 16, further comprising means for transmitting, with a transmitter of the small cell base station, data to one or more mobile devices, including continuing transmitting data to the one or more mobile devices concurrently as control signals are being received by the small cell base station during one or more of the predetermined intervals.

18. The apparatus of claim 16, further comprising:

means for deriving from the control signals time and frequency synchronization information; and means for synchronizing timing of the small cell base station and a frequency used by the small cell base station based on the time and frequency synchronization information.

19. The apparatus of claim 18 wherein the neighboring base station comprises a base station having a more accurate time and frequency reference than the small cell base station.

20. The apparatus of claim 16 wherein the small cell base station is configured to operate using a different downlink frequency than the neighboring base station.

21. The apparatus of claim 16, further comprising:

means for receiving signals from a plurality of neighboring base stations;

means for selecting the neighboring base station from the plurality of base stations based on the signals received from the plurality of neighboring base stations; and means for detecting the control signals from the selected neighboring base station.

22. The apparatus of claim 21 wherein the means for selecting the neighboring base station from the plurality of base stations based on the signals received from the plurality of neighboring base stations further comprises means for ranking the neighboring base stations based on one or more ranking criteria.

23. The apparatus of claim 22 wherein the one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station.

24. The apparatus of claim 16 wherein the means for compensating for the self-induced interference caused by the transmitter of the small cell base station further comprise:

means for monitoring signals associated with data to be transmitted by the transmitter of the small cell base station;

means for determining self-induced interference estimate for the receiver based on the signals associated with the data to be transmitted; and means for compensating for the self-induced interference based on the self-induced interference estimate.

25. The apparatus of claim 24 wherein the means for compensating for the self-induced interference based on the self-induced interference estimate further comprise:

means for generating a baseband signal based on the self-induced interference estimate to cancel out the self-induced interference at the receiver; and means for providing the baseband signal to a receiver of the small cell base station.

26. The apparatus of claim 24 wherein the means for compensating for the self-induced interference based on the self-induced interference estimate further comprise:

means for generating a radio frequency signal based on the self-induced interference estimate to cancel out the self-induced interference at the receiver; and means for providing the radio frequency signal to a receiver of the small cell base station.

27. The apparatus of claim 16 wherein the means for compensating further comprise:

means for identifying at least one mobile device attached to the small cell base station;

means for determining whether any of the at least one mobile device attached to the small cell base station is near the edge of a cell coverage area provided by the small cell base station; and means for determining a reduced transmit power level at which to operate the small cell base station during the period in which control signals are received from the macrocell if none of the at least one mobile device attached to the small cell base station is near the edge of the cell coverage area.

28. The apparatus of claim 27 wherein the means for compensating further comprise:

means for operating the small cell base station transmitter at the reduced power level during the period in which control signals are received from the macrocell.

29. The apparatus of claim 27 wherein the means for determining the reduced transmit power level further comprise:

means for determining a relative distance of the at least one mobile device from the small cell base station;

means for determining a signal quality of communication links between the at least one mobile device;

means for accessing quality of service (QoS) information associated with the at least one mobile device; and means for determining the reduced transmit power level at which to operate the small cell base station based on at least one of the relative distance, the signal quality, and the QoS information.

30. An apparatus for compensating for interference in a small cell base station, the apparatus comprising:

means for receiving, by the small cell base station, control signals from a neighboring base station associated with a wireless communication network, the control signals being transmitted by the neighboring base station at predetermined intervals; and means for compensating for self-induced interference in signals received by the small cell base station, caused by a transmitter of the small cell base station transmitting data during the predetermined intervals in which control signals are being received by the small cell base station from the neighboring base station;

wherein the means for compensating for the self-induced interference caused by the transmitter of the small cell base station further comprises:

means for determining whether a transmission by the small cell base station scheduled for the period in which the control signals are received from the macrocell can be rescheduled outside of the period in which the control signals are received from the macrocell; and means for rescheduling the transmission by the small cell base station to occur outside of the period in which the control signals are received from the macrocell if the transmission can be rescheduled.

31. A non-transitory, computer-readable medium, having stored thereon computer readable instructions for compensating for interference in a small cell base station, comprising instructions configured to cause a computer to:

receive, by the small cell base station, control signals from a neighboring base station associated with a wireless communication network, the control signals being transmitted by the neighboring base station at predetermined intervals; and compensate for self-induced interference in signals received by the small cell base station, caused by a transmitter of the small cell base station transmitting data during the predetermined intervals in which control signals are being received by the small cell base station from the neighboring base station;

wherein the predetermined intervals comprise listen periods in which the small cell base station listens for and is able to receive control signals from the neighboring base station, and wherein the non-transitory computer-readable medium further comprises instructions configured to cause the computer to compensate for self-induced interference during the listen periods, while the small cell base station receives control signals.

32. The non-transitory computer-readable medium of claim 31, further comprising instructions configured to cause the computer to transmit, with a transmitter of the small cell base station, data to one or more mobile devices, including continuing to transmit data to the one or more mobile devices concurrently as control signals are being received by the small cell base station during one or more of the predetermined intervals.

33. The non-transitory computer-readable medium of claim 31 wherein the instructions configured to cause the computer to compensate for the self-induced interference further comprise instructions configured to cause the computer to:

identify at least one mobile device attached to the small cell base station;

determine whether any of the at least one mobile device attached to the small cell base station is near the edge of a cell coverage area provided by the small cell base station; and determine a reduced transmit power level at which to operate the small cell base station during the period in which control signals are received from the macrocell if none of the at least one mobile device attached to the small cell base station is near the edge of the cell coverage area.

34. The non-transitory computer-readable medium of claim 33 further comprising instructions configured to cause the computer to:

operate the small cell base station transmitter at the reduced power level during the period in which control signals are received from the macrocell.

35. The non-transitory computer-readable medium of claim 33 wherein the instructions configured to cause the computer to determine the reduced transmit power level further comprise instructions configured to cause the computer to:

determine a relative distance of the at least one mobile device from the small cell base station;

determine signal quality of communication links between the at least one mobile device;

access quality of service (QoS) information associated with the at least one mobile device; and determine the reduced transmit power level at which to operate the small cell base station based on at least one of the relative distance, the signal quality, and the QoS information.

36. The non-transitory computer-readable medium of claim 31, further comprising instructions configured to cause the computer to:

receive signals from a plurality of neighboring base stations;

select the neighboring base station from the plurality of base stations based on the signals received from the plurality of neighboring base stations; and detect the control signals from the selected neighboring base station.

37. The non-transitory computer-readable medium of claim 36 wherein the instructions configured to cause the computer to select the neighboring base station from the plurality of base stations based on the signals received from the plurality of neighboring base stations further comprise instructions configured to cause the computer to rank the neighboring base stations based on one or more ranking criteria.

38. The non-transitory computer-readable medium of claim 37 wherein the one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station.

39. The non-transitory computer-readable medium of claim 31 wherein the instructions configured to cause the computer to compensate for the self-induced interference further comprise instructions configured to cause the computer to:
monitor signals associated with data to be transmitted by the transmitter of the small cell base station;
determine self-induced interference estimate for the receiver based on the signals associated with the data to be transmitted; and
compensate for the self-induced interference based on the self-induced interference estimate.

40. The non-transitory computer-readable medium of claim 39 wherein the instructions configured to cause the computer to compensate for the self-induced interference based on the self-induced interference estimate further comprise instructions configured to cause the computer to:
generate a baseband signal based on the self-induced interference estimate to cancel out the self-induced interference at the receiver; and
provide the baseband signal to a receiver of the small cell base station.

41. The non-transitory computer-readable medium of claim 39 wherein the instructions configured to cause the computer to compensate for the self-induced interference based on the self-induced interference estimate further comprise instructions configured to cause the computer to:
generate a radio frequency signal based on the self-induced interference estimate to cancel out the self-induced interference at the receiver; and
provide the radio frequency signal to a receiver of the small cell base station.

42. The non-transitory computer-readable medium of claim 31, further comprising instructions configured to cause the computer to:
derive from the control signals time and frequency synchronization information; and
synchronize timing of the small cell base station and a frequency used by the small cell base station based on the time and frequency synchronization information.

43. The non-transitory computer-readable medium of claim 31 wherein the small cell base station is configured to operate using a different downlink frequency than the neighboring base station.

44. A non-transitory, computer-readable medium, having stored thereon computer readable instructions for compensating for interference in a small cell base station, comprising instructions configured to cause a computer to:
receive, by the small cell base station, control signals from a neighboring base station associated with a wireless communication network, the control signals being transmitted by the neighboring base station at predetermined intervals;
compensate for self-induced interference in signals received by the small cell base station, caused by a transmitter of the small cell base station transmitting data during the predetermined intervals in which control signals are being received by the small cell base station from the neighboring base station;
derive from the control signals time and frequency synchronization information; and
synchronize timing of the small cell base station and a frequency used by the small cell base station based on the time and frequency synchronization information;
wherein the neighboring base station comprises a base station having a more accurate time and frequency reference than the small cell base station.

45. A non-transitory, computer-readable medium, having stored thereon computer readable instructions for compensating for interference in a small cell base station, comprising instructions configured to cause a computer to:
receive, by the small cell base station, control signals from a neighboring base station associated with a wireless communication network, the control signals being transmitted by the neighboring base station at predetermined intervals; and
compensate for self-induced interference in signals received by the small cell base station, caused by a transmitter of the small cell base station transmitting data during the predetermined intervals in which control signals are being received by the small cell base station from the neighboring base station;
wherein the instructions configured to cause the computer to compensate for the self-induced interference caused by the transmitter of the small cell base station further comprise instructions configured to cause the computer to:
determine whether a transmission by the small cell base station scheduled for the period in which the control signals are received from the macrocell can be rescheduled outside of the period in which the control signals are received from the macrocell; and
reschedule the transmission by the small cell base station to occur outside of the period in which the control signals are received from the macrocell if the transmission can be rescheduled.

46. An apparatus for compensating for interference in a small cell base station comprising:
a tangible, non-transitory computer-readable memory;
a plurality of modules comprising processor executable code stored in the memory;
a processor connected to the memory and configured to access the plurality of modules stored in the memory; and
a network listen module configured to:
detect, upon receiving by the small cell base station, control signals from a neighboring base station associated with a wireless communication network, the control signals being transmitted by the neighboring base station at predetermined intervals; and
compensate for self-induced interference in signals received by the small cell base station, caused by a transmitter of the small cell base station transmitting data during the predetermined intervals in which control signals are being received by the small cell base station from the neighboring base station;
wherein the predetermined intervals comprise listen periods in which the small cell base station listens for and is able to receive control signals from the neighboring base station, and wherein the network listen module is further configured to compensate for the self-induced interference during the listen periods, while the small cell base station receives control signals.

47. The apparatus of claim 46, further comprising a transmitter of the small cell base station configured to transmit data to one or more mobile devices, including continuing to transmit data to the one or more mobile devices concurrently as control signals are being received by the small cell base station during one or more of the predetermined intervals.

48. The apparatus of claim 46 wherein the network listen module is configured to:
   derive from the control signals time and frequency synchronization information; and
   synchronize timing of the small cell base station and a frequency used by the small cell base station based on the time and frequency synchronization information.

49. The apparatus of claim 46 further comprising a power control module configured to:
   identify at least one mobile device attached to the small cell base station;
   determine whether any of the at least one mobile device attached to the small cell base station is near the edge of a cell coverage area provided by the small cell base station; and
   determine a reduced transmit power level at which to operate the small cell base station during the period in which control signals are received from the macrocell if none of the at least one mobile device attached to the small cell base station is near the edge of the cell coverage area.

50. The apparatus of claim 49 wherein the power control module is further configured to:
   operate the small cell base station transmitter at the reduced power level during the period in which control signals are received from the macrocell.

51. The apparatus of claim 49 wherein the power control module being configured to determine the reduced transmit power level is further configured to:
   determine a relative distance of the at least one mobile device from the small cell base station;
   determine signal quality of communication links between the at least one mobile device;
   access quality of service (QoS) information associated with the at least one mobile device; and
   determine the reduced transmit power level at which to operate the small cell base station based on at least one of the relative distance, the signal quality, and the QoS information.

52. The apparatus of claim 46 wherein the network listen module is configured to:
   receive signals from a plurality of neighboring base stations;
   select the neighboring base station from the plurality of base stations based on the signals received from the plurality of neighboring base stations; and
   detect the control signals from the selected neighboring base station.

53. The apparatus of claim 51 wherein the network listen module being configured to select the neighboring base station from the plurality of base stations based on the signals received from the plurality of neighboring base stations is further configured to rank the neighboring base stations based on one or more ranking criteria.

54. The apparatus of claim 52 wherein the one or more ranking criteria comprise at least one of: a signal strength of the signals received from the neighboring base station at the small cell base station, a frequency separation of downlink frequencies used by the neighboring base station and the small cell base station, a signal quality of the signals received from the neighboring base station at the small cell base station, and a stratum level advertised by the neighboring base station.

55. The apparatus of claim 46 further comprising an interference compensation module configured to:
   monitor signals associated with data to be transmitted by the transmitter of the small cell base station;
   determine self-induced interference estimate for the receiver based on the signals associated with the data to be transmitted; and
   compensate for the self-induced interference based on the self-induced interference estimate.

56. The apparatus of claim 55 wherein the interference compensation module being configured to compensate for the self-induced interference based on the self-induced interference estimate further comprise instructions configured to cause the computer to:
   generate a radio frequency signal based on the self-induced interference estimate to cancel out the self-induced interference at the receiver; and
   provide the radio frequency signal to a receiver of the small cell base station.

57. The apparatus of claim 46 wherein the small cell base station is configured to operate using a different downlink frequency than the neighboring base station.

58. An apparatus for compensating for interference in a small cell base station comprising:
   a tangible, non-transitory computer-readable memory;
   a plurality of modules comprising processor executable code stored in the memory;
   a processor connected to the memory and configured to access the plurality of modules stored in the memory; and
   a network listen module configured to:
      detect, upon receiving by the small cell base station, control signals from a neighboring base station associated with a wireless communication network, the control signals being transmitted by the neighboring base station at predetermined intervals; and
      compensate for self-induced interference in signals received by the small cell base station, caused by a transmitter of the small cell base station transmitting data during the predetermined intervals in which control signals are being received by the small cell base station from the neighboring base station; and
   an interference compensation module configured to:
      monitor signals associated with data to be transmitted by the transmitter of the small cell base station;
      determine self-induced interference estimate for the receiver based on the signals associated with the data to be transmitted;
      compensate for the self-induced interference based on the self-induced interference estimate;
      generate a baseband signal based on the self-induced interference estimate to cancel out the self-induced interference at the receiver; and
      provide the baseband signal to a receiver of the small cell base station.

59. An apparatus for compensating for interference in a small cell base station comprising:
   a tangible, non-transitory computer-readable memory;
   a plurality of modules comprising processor executable code stored in the memory;

a processor connected to the memory and configured to access the plurality of modules stored in the memory; and a network listen module configured to:
  detect, upon receiving by the small cell base station, control signals from a neighboring base station associated with a wireless communication network, the control signals being transmitted by the neighboring base station at predetermined intervals;
  compensate for self-induced interference in signals received by the small cell base station, caused by a transmitter of the small cell base station transmitting data during the predetermined intervals in which control signals are being received by the small cell base station from the neighboring base station;
  derive from the control signals time and frequency synchronization information; and
  synchronize timing of the small cell base station and a frequency used by the small cell base station based on the time and frequency synchronization information;
wherein the neighboring base station comprises a base station having a more accurate time and frequency reference than the small cell base station.

60. An apparatus for compensating for interference in a small cell base station comprising:

a tangible, non-transitory computer-readable memory;

a plurality of modules comprising processor executable code stored in the memory;

a processor connected to the memory and configured to access the plurality of modules stored in the memory;

a network listen module configured to:
  detect, upon receiving by the small cell base station, control signals from a neighboring base station associated with a wireless communication network, the control signals being transmitted by the neighboring base station at predetermined intervals; and
  compensate for self-induced interference in signals received by the small cell base station, caused by a transmitter of the small cell base station transmitting data during the predetermined intervals in which control signals are being received by the small cell base station from the neighboring base station; and a scheduling module configured to:
  determine whether a transmission by the small cell base station scheduled for the period in which the control signals are received from the macrocell can be rescheduled outside of the period in which the control signals are received from the macrocell; and
  reschedule the transmission by the small cell base station to occur outside of the period in which the control signals are received from the macrocell if the transmission can be rescheduled.

* * * * *